United States Patent
Tanabe et al.

(10) Patent No.: US 9,678,477 B2
(45) Date of Patent: Jun. 13, 2017

(54) MECHANICAL COMPONENT, MECHANICAL COMPONENT MANUFACTURING METHOD, MOVEMENT, AND TIMEPIECE

(71) Applicant: SEIKO INSTRUMENTS INC., Chiba-shi, Chiba (JP)

(72) Inventors: Sachiko Tanabe, Chiba (JP); Takashi Niwa, Chiba (JP); Masahiro Nakajima, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 14/841,973

(22) Filed: Sep. 1, 2015

(65) Prior Publication Data

US 2016/0077491 A1 Mar. 17, 2016

(30) Foreign Application Priority Data

Sep. 12, 2014 (JP) .................. 2014-186363
Jul. 6, 2015 (JP) .................. 2015-135595

(51) Int. Cl.
*G04B 13/02* (2006.01)

(52) U.S. Cl.
CPC ........... *G04B 13/02* (2013.01); *G04B 13/021* (2013.01); *G04B 13/026* (2013.01)

(58) Field of Classification Search
CPC .... G04B 17/34; G04B 17/325; G04B 19/247; G04B 11/028; G04B 13/022; G04B 35/00; G04B 13/026; G04B 13/02; G04B 13/021

See application file for complete search history.

(56) References Cited

U.S. PATENT DOCUMENTS

| 3,142,148 | A | * | 7/1964 | Morgan | G04B 19/042 116/332 |
| 3,659,412 | A | * | 5/1972 | Miyasaka | G04B 35/00 368/37 |
| 3,743,365 | A | * | 7/1973 | Kato | F16C 27/066 384/536 |
| 4,358,166 | A | * | 11/1982 | Antoine | B60H 1/00857 384/215 |
| 4,408,898 | A | * | 10/1983 | Vuilleumier | G04B 13/002 368/185 |
| 7,438,465 | B2 | * | 10/2008 | Bitterli | G04B 13/026 368/322 |

(Continued)

FOREIGN PATENT DOCUMENTS

EP 1708045 10/2006

*Primary Examiner* — Sean Kayes
(74) *Attorney, Agent, or Firm* — Adams & Wilks

(57) ABSTRACT

A mechanical component configured to rotate with a shaft member includes a component main body having a through-hole through which the shaft member is passed, and one or more shaft support portions formed on the inner surface of the through-hole to fix the shaft member to the component main body. The one or more shaft support portions protrude from the inner surface of the through-hole and are capable of retaining the shaft member due to an elastic force. The one or more shaft support portions are made of material having a larger elongation percentage than that of the material of the component main body thereby preventing breakage of the mechanical component due to stress created when the shaft member is forced through the through-hole in the component main body.

16 Claims, 16 Drawing Sheets

(56) References Cited

U.S. PATENT DOCUMENTS

| | | | | |
|---|---|---|---|---|
| 7,572,050 | B2* | 8/2009 | Bitterli | G04B 13/026 |
| | | | | 368/322 |
| 7,575,369 | B2* | 8/2009 | Bitterli | G04B 13/026 |
| | | | | 116/328 |
| 8,274,864 | B2* | 9/2012 | Ono | F16D 7/021 |
| | | | | 368/220 |
| 8,591,101 | B2* | 11/2013 | Hiraoka | G04B 15/14 |
| | | | | 368/132 |
| 8,777,481 | B2* | 7/2014 | Conus | G04B 31/04 |
| | | | | 368/324 |
| 9,244,432 | B2* | 1/2016 | Lagorgette | G04B 17/20 |
| 9,292,005 | B2* | 3/2016 | Hessler | G04B 31/004 |
| 2006/0055097 | A1* | 3/2006 | Conus | G04B 17/066 |
| | | | | 267/273 |
| 2011/0310709 | A1* | 12/2011 | Vaucher | G04B 13/021 |
| | | | | 368/132 |
| 2014/0160901 | A1* | 6/2014 | Cusin | G04B 13/022 |
| | | | | 368/127 |
| 2015/0023140 | A1* | 1/2015 | Daout | G04B 17/345 |
| | | | | 368/177 |

* cited by examiner

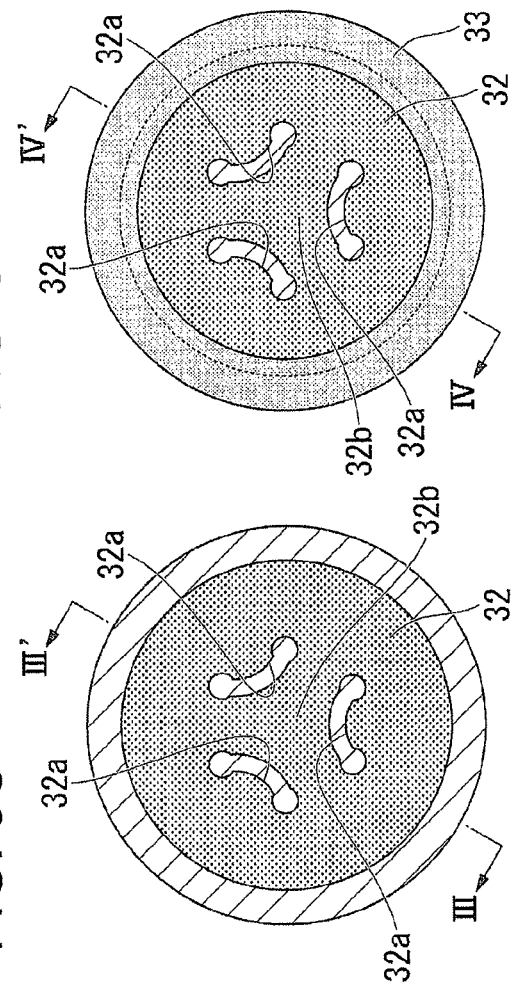
FIG. 3A
FIG. 3C
FIG. 3E
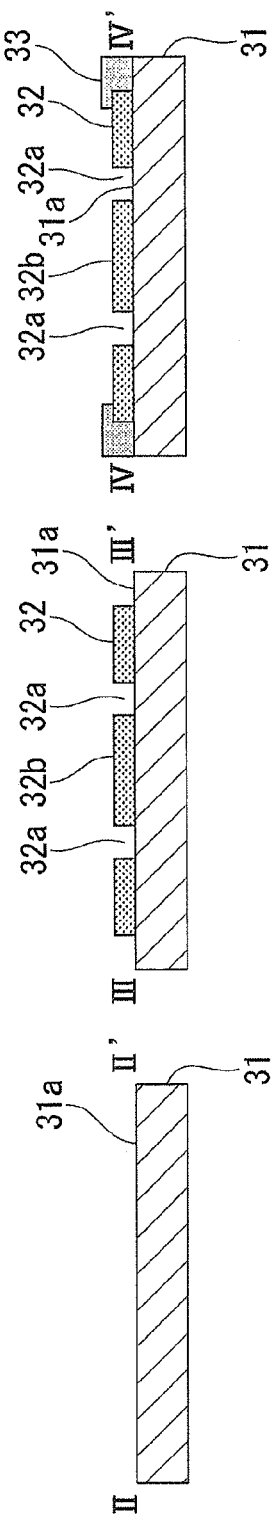
FIG. 3B
FIG. 3D
FIG. 3F

FIG. 5A
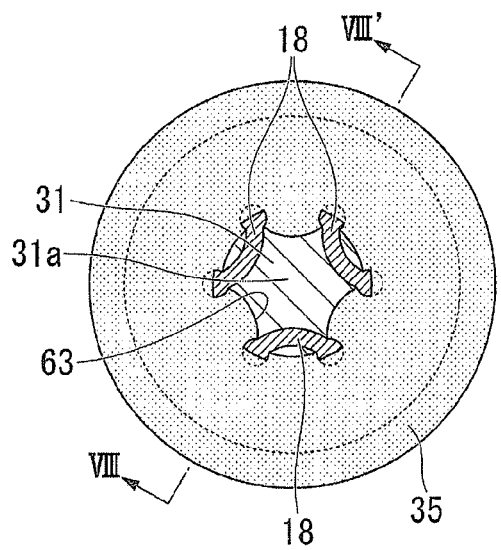
FIG. 5C
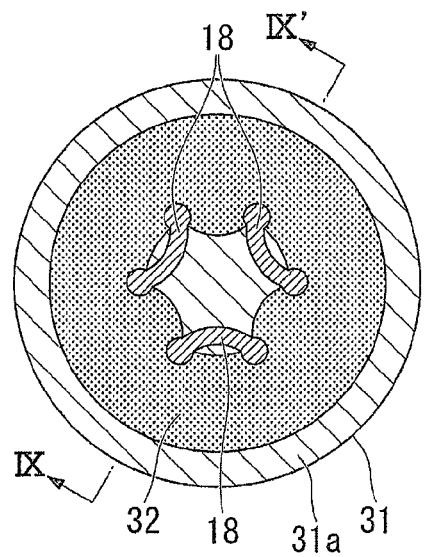
FIG. 5B
FIG. 5D
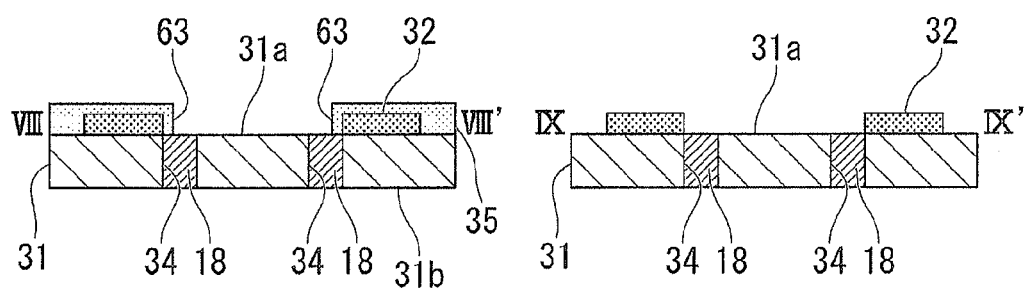

MECHANICAL COMPONENT, MECHANICAL COMPONENT MANUFACTURING METHOD, MOVEMENT, AND TIMEPIECE

BACKGROUND OF THE INVENTION

1. Field of the Invention

The present invention relates to a mechanical component, a mechanical component manufacturing method, a movement, and a timepiece.

2. Description of the Related Art

A precision machine such as a mechanical timepiece employs a mechanical component like a cogwheel which rotates with a shaft member.

FIG. 23 shows an example of a structure connecting a mechanical component and a shaft member (See, for example, EP-A-1708045 (Patent Literature 1)).

FIG. 23 shows a mechanical component 90 which has, at the center of a component main body 91 formed of a brittle material, a central hole portion 94 into which a shaft member 30 is forced and which is of a triangular configuration in planar view; and in close proximity to each side of the central hole portion 94, there is formed a slit-like opening 92.

Bridge portions 93 between the central hole portion 94 and the opening 92 retain the shaft member 30 due to their elasticity. A mechanical component of this type is formed thin, so that it is subject to the stress generated when the shaft member is forced in; in the mechanical component 90, however, it is possible to mitigate the stress due to the elasticity of the bridge portions 93.

In the mechanical component 90, however, the bridge portions 93 are subject to breakage due to the forcing-in of the shaft member 30.

A reduction in the elastic deformation amount of the bridge portions 93 might make the bridge portions 93 less subject to breakage; in that case, however, there is a fear of the fixation of the mechanical component 90 to the shaft member 30 being rather insufficient.

SUMMARY OF THE INVENTION

It is an aspect of the present application to provide a mechanical component, a mechanical component manufacturing method, a movement, and a timepiece which are free from breakage due to the forcing-in of the shaft member and which allow the mechanical component to be reliably fixed to the shaft member.

In accordance with the present application, there is provided a mechanical component configured to rotate with a shaft member, including: a component main body having a through-hole through which the shaft member is passed; and one or a plurality of shaft support portions formed on the inner surface of the through-hole and serving to fix the shaft member to the component main body; the shaft support portion(s) protrude(s) into the through-hole from the inner surface of the through-hole and is (are) capable of retaining the shaft member due to an elastic force; and the elongation percentage of the shaft support portion(s) is larger than the elongation percentage of the component main body.

In this construction, the elongation percentage of the shaft support portion(s) is larger than the elongation percentage of the component main body, and the shaft support portion(s) retain(s) the shaft member due to an elastic force, so that displacement of the shaft member is permissible to some extent, whereby a superior buffer effect is provided. Thus, even when a brittle material is employed for the component main body, it is possible to prevent breakage of the mechanical component due to the stress when the shaft member is forced in.

Further, as stated above, the shaft support portion(s) exhibit(s) a large displacement permission amount, so that sufficient rotation looseness torque and extraction force are secured, making it possible to reliably retain the shaft member. Thus, it is possible to reliably transmit the torque of the shaft member to the component main body, making it possible to improve the timekeeping accuracy of the timepiece employing the mechanical component.

It is desirable for the shaft support portion(s), to be formed of a material capable of plastic deformation and of retaining the shaft member by a bending elastic force.

In this construction, it is possible to permit displacement of the shaft member beyond an elastic deformation range, so that it is possible to enhance the buffer effect. Thus, even when a brittle material is employed for the component main body, it is possible to prevent breakage of the mechanical component due to the stress when the shaft member is forced in.

When the shaft support portion has bending elasticity and is capable of plastic deformation, it is little subject to breakage itself.

One end side and the other end side of the shaft support portion are each fixed to the component main body, and the intermediate portion thereof is formed in an arcuate configuration spaced away from the inner surface of the through-hole; it is desirable for the intermediate portion to be capable of retaining the shaft member by a bending elastic force.

In this construction, both end sides of the shaft support portion are fixed to the component main body, so that it is possible to enhance the durability of the shaft support portion.

It is desirable for the component main body to have a retaining recess as an anchor structure fixing this shaft support portion by retaining a part of the shaft support portion.

In this construction, it is possible to prevent detachment of the shaft support portion and to enhance the durability thereof.

It is desirable for the inner surface of the through-hole to have a displacement regulating protrusion which, when the shaft member is deviated from a predetermined normal position, abuts the shaft member to regulate its outward displacement.

In this construction, it is possible to regulate positional deviation of the shaft member, so that it is possible to prevent damage of the mechanical component and to improve the timekeeping precision of the timepiece employing this mechanical component.

It is desirable for the shaft support portion to be equipped with a pair of stationary portions one end side and the other end side of which are respectively fixed to the component main body, a proximal portion extending from the stationary portion into the central hole portion, and an inner peripheral extension portion connecting the extension ends of the proximal portion to each other, with the inner peripheral extension portion extending in the peripheral direction of the component main body and capable of retaining the shaft member by a bending elastic force.

In this construction, the inner peripheral extension portion extends along the peripheral direction of the component main body, so that it abuts the shaft member over a wide peripheral range. Thus, the force acting on the shaft support portion is dispersed to prevent breakage of the shaft support portion, and it is possible to reliably support the shaft member by the inner peripheral extension portion.

It is desirable that the inner peripheral extension portion have an inwardly protruding retaining protrusion abutting the shaft member to retain the same, with the retaining protrusion being formed to protrude inwards from an end portion of the inner peripheral extension portion.

In this construction, it is possible to mitigate stress concentration at the end portion of the inner peripheral extension portion, making it possible to prevent breakage of the shaft support portion.

The shaft support portion may have an opening formed to extend in the peripheral direction of the component main body.

In this construction, it is possible to impart a bending elastic force to the radially inward portion of the opening, and it is possible to reliably retain the shaft member due to this bending elastic force.

The shaft support portion may have a displacement regulating structure regulating displacement in the thickness direction with respect to the component main body.

In this construction, it is possible to regulate positional deviation of the shaft member, so that it is possible to prevent breakage of the mechanical component, making it possible to improve the timekeeping accuracy of the timepiece employing this mechanical component.

It is desirable that the component main body be formed of a brittle material and that the shaft support portion be formed of metal.

The shaft support portion may form a forcing-in portion into which the shaft member is forced in to be thereby fixed to the shaft member.

The movement of the present application is equipped with the mechanical component.

In this construction, it is possible to provide a movement of high timekeeping accuracy.

The timepiece of the present application is equipped with the mechanical component.

In this construction, it is possible to provide a timepiece of high timekeeping accuracy.

In accordance with the present application, there is provided a method of manufacturing a mechanical component rotating with a shaft member, the mechanical component including: a component main body having a through-hole through which the shaft member is passed; and one or a plurality of shaft support portions formed on the inner surface of the through-hole and serving to fix the shaft member to the component main body, with the shaft support portion(s) protruding into the through-hole from the inner surface of the through-hole and capable of retaining the shaft member due to an elastic force, and the elongation percentage of the shaft support portion(s) being larger than the elongation percentage of the component main body, the method including the steps of: forming a mask having an inner configuration corresponding to the configuration of the shaft supporting portion(s) and an outer configuration corresponding to the outer configuration of the component main body on at least one surface of a base member constituting the component main body and forming a structure for retaining the shaft support portion(s) on the base member in conformity with the inner configuration of the mask; forming the shaft support portion(s) formed of the material through electroforming; and removing unnecessary portions of the base member in conformity with the outer configuration of the mask.

According to the present application, the forcing-in portion is formed by using a common mask and the outer configuration of the component main body is determined, so that it is possible to enhance the coaxiality of the component main body with respect to the shaft member. Further, it is possible to enhance the dimensional accuracy in the radial direction.

Thus, axial deviation with respect to the shaft member does not easily occur, and it is possible to prevent offset during the operation of the mechanical component. Accordingly, it is possible to enhance the timekeeping accuracy of the timepiece employing this mechanical component.

In accordance with the present application, there is provided a mechanical component rotating with a shaft member, including a component main body having a through-hole through which the shaft member is passed, and a forcing-in portion formed on the inner surface of the through-hole and configured to be fixed to the shaft member through the forcing-in of the shaft member; the forcing-in portion has one or a plurality of shaft support portions formed of a material capable of plastic deformation; and the shaft support portion(s) extend(s) into the through-hole from the inner surface of the through-hole and is capable of retaining the shaft member by a bending elastic force.

In this construction, there is employed a shaft support portion exhibiting bending elasticity and capable of plastic deformation. Due to the existence of a range capable of plastic deformation, the shaft support portion can permit displacement of the shaft member beyond the elastic deformation range, so that it is possible to enhance the buffer effect. Thus, even when a brittle material is used for the component main body, it is possible to prevent breakage of the mechanical component due to the stress when the shaft member is forced in.

Further, the shaft support portion has bending elasticity and is capable of plastic deformation, so that it does not easily suffer breakage.

Further, as stated above, the shaft support portion is of a large displacement permission amount, so that it is possible to secure a sufficient rotation looseness torque and extraction force, making it possible to reliably retain the shaft member. Thus, it is possible to reliably transmit the torque of the shaft member to the component main body, making it possible to enhance the timekeeping accuracy of the timepiece employing this mechanical component.

It is desirable that one end side and the other end side of the shaft support portion be respectively fixed to the component main body and that the intermediate portion thereof be formed in an arcuate configuration spaced away from the inner surf ace of the through-hole, with the intermediate portion being capable of retaining the shaft member by a bending elastic force.

In this construction, both end sides of the shaft support portion are fixed to the component main body, so that it is possible to enhance the durability of the shaft support portion.

It is desirable for the component main body to have a retaining recess as an anchor structure which, retains a part of the shaft support portion to thereby fix the shaft support portion in position.

In this construction, it is possible to prevent detachment of the shaft support portion and to enhance the durability thereof.

It is desirable for the inner surface of the through-hole to have a displacement regulating protrusion which, when the shaft member is deviated from a predetermined normal position, abuts the shaft member to regulate outward displacement thereof.

In this construction, it is possible to regulate positional deviation of the shaft member, so that it is possible to prevent breakage of the mechanical component and to improve the timekeeping accuracy of the timepiece employing this mechanical component.

The movement of the present application is equipped with the mechanical component.

In this construction, it is possible to provide a movement of high timekeeping accuracy.

The timepiece of the present application is equipped with the mechanical component.

In this construction, it is possible to provide a timepiece of high timekeeping accuracy.

In accordance with the present application, there is provided a method of manufacturing a mechanical component rotating with a shaft member, the mechanical component including: a component main body having a through-hole through which the shaft member is passed; and a forcing-in portion formed on the inner surface of the through-hole and fixed to the shaft member through the forcing-in of the shaft member, the forcing-in portion having one or a plurality of shaft support portions formed of a material capable of plastic deformation, with the shaft support portion(s) protruding into the through-hole from the inner surface of the through-hole and capable of retaining the shaft member due to a bending elastic force, the method including the steps of: forming a mask having an inner configuration corresponding to the configuration of the forcing-in portion and an outer configuration corresponding to the outer configuration of the component main body on at least one surface of a base member constituting the component main body and forming a structure for retaining the shaft support portion(s) on the base member in conformity with the inner configuration of the mask; forming the forcing-in portion formed of the material through electroforming; and removing unnecessary portions of the base member in conformity with the outer configuration of the mask.

According to the present application, the forcing-in portion is formed by using a common mask, and the outer configuration of the component main body is determined, so that it is possible to enhance the coaxiality of the component main body with respect to the shaft member. Further, it is possible to enhance the dimensional precision in the radial direction.

Thus, axial deviation with respect to the shaft member does not occur easily, making it possible to prevent offset during the operation of the mechanical component. Thus, it is possible to enhance the timekeeping accuracy of the timepiece employing this mechanical component.

In the mechanical component according to the present application, the elongation percentage of the shaft support portion is larger than the elongation percentage of the component main body, and the shaft support portion retains the shaft member by an elastic force, so that displacement of the shaft member is permissible to some extent, thus providing a superior buffer effect. Thus, even when a brittle material is used for the component main body, it is possible to prevent breakage of the mechanical component due to the stress when the shaft member is forced in.

Further, as stated above, the shaft support portion exhibits a large displacement permission amount, so that it is possible to secure a sufficient rotation looseness torque and extraction force, making it possible to reliably retain the shaft member. Thus, it is possible to reliably transmit the torque of the shaft member to the component main body, making it possible to improve the timekeeping accuracy of the timepiece employing the mechanical component.

According to the mechanical component manufacturing method of the present application, the forcing-in portion is formed, and the outer configuration of the component main body is determined by using a common mask, so that it is possible to enhance the coaxiality of the component main body with respect to the shaft member. Further, it is possible to enhance the dimensional precision in the radial direction.

Thus, axial deviation with respect to the shaft member does not easily occur, making it possible to prevent offset during the operation of the mechanical component. Thus, it is possible to enhance the timekeeping accuracy of the timepiece employing this mechanical component.

BRIEF DESCRIPTION OF THE DRAWINGS

FIGS. 1(a) and 1(b) are diagrams illustrating a mechanical component according to a first embodiment of the present invention, wherein FIG. 1(a) is an overall plan view, and FIG. 1(b) is an enlarged plan view of a part of FIG. 1(b).

FIGS. 3(a) through 3(f) are explanatory views illustrating the method of manufacturing the mechanical component according to an embodiment of the present invention.

FIGS. 5(a) through 5(d) are explanatory views, subsequent to FIGS. 4(a) through 4(f), illustrating the method of manufacturing the mechanical component according to the embodiment of the present invention.

DETAILED DESCRIPTION OF THE PREFERRED EMBODIMENTS (First Embodiment, Mechanical Component)

A mechanical component 10 according to the first embodiment of the present invention will be described.

Figure 1A:
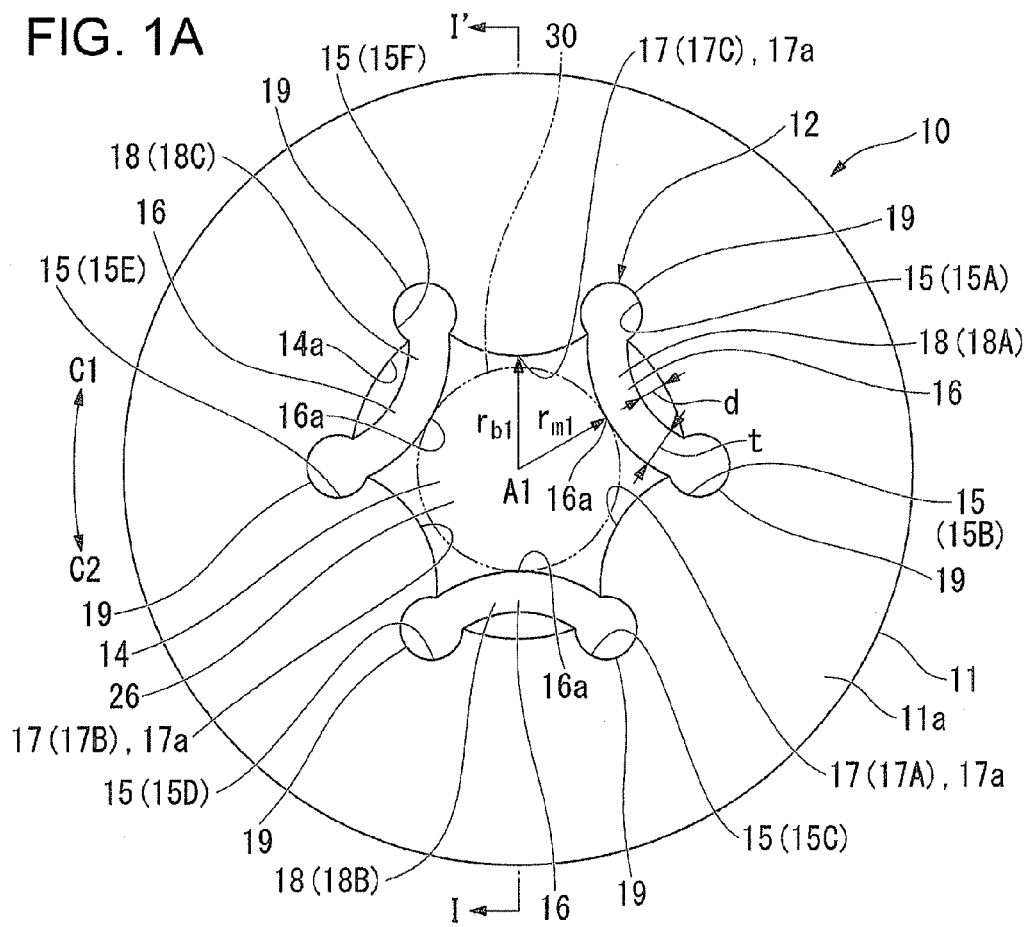

FIG. 1(a) is a plan view of the mechanical component 10, and FIG. 1 (b) is an enlarged plan view of apart of the mechanical component 10. FIG. 2 is a sectional view taken along line I-I' of FIG. 1(a). FIG. 1 illustrates the mechanical component 10 prior to the forcing-in of a shaft member 30.

As shown in FIG. 1 and FIG. 2, the mechanical component 10 is equipped with a schematically disc-like component main body 11, and a forcing-in portion 12 provided on the inner side of the component main body 11.

Reference numeral A1 indicates a center axis of the component main body 11, and a rotation axis of the mechanical component 10.

In the following description, the "peripheral direction" refers to the peripheral direction of a circle the center of which coincides with the center axis A1 within the plane including a first surface 11a of the component main body 11. The "radial direction" refers to the radial direction of the circle. The term "inward" refers to a direction toward the center axis A1, and the term "outward" refers to a direction away from the center axis A1. Of the peripheral direction, the rotational direction to the right in FIG. 1 (a) is referred to the direction C1, and the rotational direction to the left is referred to as the direction C2.

As shown in FIG. 1, at the center of the component main body 11, there is formed a central hole portion 14 (through-hole) extending through the component main body 11 in the thickness direction.

At the inner edge 14a (inner surface) of the central hole portion 14, there are formed a plurality of retaining recesses 15 at peripheral intervals.

The retaining recesses 15 are formed in an arcuate configuration in planar view.

The configuration in planar view of the retaining recesses 15 is not restricted to the arcuate one; it may also be rectangular, triangular, etc.

In the example shown in FIG. 1, there are formed six retaining recesses 15. These retaining recesses 15 are sometimes referred to as the first through sixth retaining recesses 15A through 15F in that order as counted clockwise.

The number of retaining recesses is not restricted to that of the example shown; it may also be one or plural.

Figure 1B:
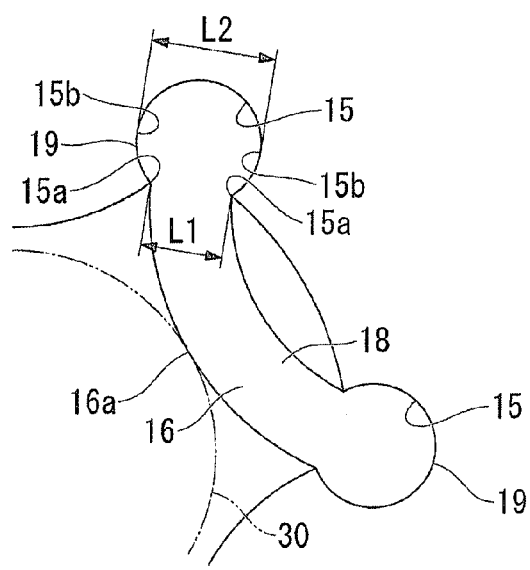
Figure 2:
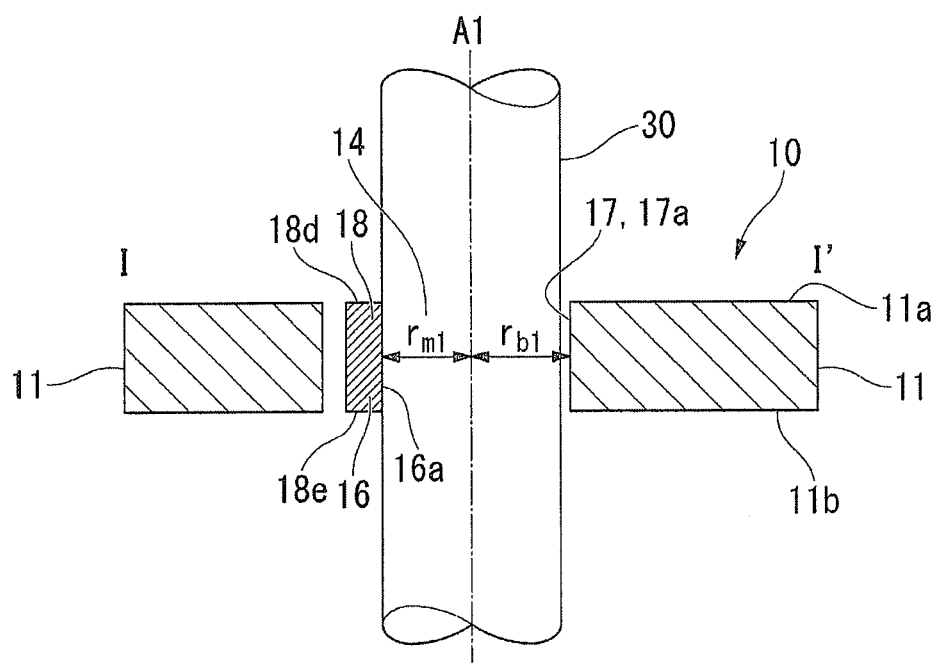
FIG. 2 is a sectional view, taken along line I-I' of FIG. 1(a), of the mechanical component of the embodiment of the present invention.

As shown in FIG. 1(b), in the retaining recess 15, the width dimension L1 as measured at the positions 15a (first positions) nearest to the central hole portion 14 is smaller than the width dimension L2 as measured at the positions 15b where the width dimension is maximum (positions on the depth side of the retaining recess 15 with respect to the positions 15a) (second positions).

This retaining recess 15 retains an end portion 19 of the shaft support portion 18, whereby it functions as an anchor structure regulating displacement in the direction in which the shaft support portion 18 is detached. Due to this construction, it is possible to prevent detachment of the shaft support portion 18, and to enhance the durability thereof.

So long as the width dimension at the first positions is smaller than the width dimension at the second positions on the deeper side of the first positions, the first positions of the retaining recess may not be positions nearest to the central hole portion side, and the second positions may not be positions where the width dimension is maximum.

At the inner peripheral edge 14a (inner surface) of the central hole portion 14, there are formed a plurality of displacement regulating protrusions 17 which abut the shaft member 30 to regulate its outward displacement when the shaft member 30 is detached from a predetermined normal position (for example, the central position of the central hole portion 14).

The displacement regulating protrusions 17 are formed in an arcuate configuration in planar view.

The configuration in planar view of the displacement regulating protrusions 17 is not restricted to an arcuate one; it may also be rectangular, triangular, etc.

In the example shown in FIG. 1, there are formed three displacement regulating protrusions 17 at peripheral intervals. These displacement regulating protrusions 17 are sometimes referred to as the first through third displacement regulating protrusions 17A through 17C in that order as counted clockwise.

The peripheral position of the first displacement regulating protrusion 17A is between the retaining recesses 15B and 15C; the peripheral position of the second displacement regulating protrusion 17B is between the retaining recesses 15D and 15E; and the peripheral position of the third displacement regulating protrusion 17C is between the retaining recesses 15F and 15A.

It is desirable that the central portion 17a of each displacement regulating protrusion 17 be situated nearest to the center axis A1. Due to the formation of the displacement regulating protrusions 17, it is possible to regulate the positional deviation of the shaft member 30, so that it is possible to prevent breakage of the mechanical component 10 and to improve the timekeeping accuracy of the timepiece employing this mechanical component 10.

The number of displacement regulating protrusions is not restricted to that of the example shown; it may also be one or plural.

As the material of the component main body 11, a brittle material such a ceramic material is preferable. Examples of the ceramic material that can be used include Si, SiC, $Si_3N_4$, zirconium, ruby, and carbon material.

The brittle material is a material exhibiting a small critical distortion amount in elastic deformation due to external stress; when the elastic deformation exceeds a limit, fracture results, there existing no yield point; preferably, its elastic deformation range is 1% or less; more preferably, it is 0.5% or less. The brittle material is of low tenacity.

It is desirable for the component main body 11 to exhibit high insulation property. When the insulation property of the component main body 11 is not sufficient, it is desirable to form an oxide film on the surface in contact with the shaft support portions 18.

The retaining recesses 15 (15A through 15F) have the shaft support portions 18 constituting a forcing-in portion 12.

One end portion 19 and the other end portion 19 of each shaft support portion 18 are respectively fixed to the retaining recesses 15, and at least a part of the intermediate portion 16 (the portion between the end portions 19, 19) is formed in an arcuate configuration spaced away from the inner surface of the central hole portion 14.

In the example shown in FIG. 1, the forcing-in portion 12 is formed by three shaft support portions 18. These shaft support portions 18 are sometimes referred to as the first through third retaining recesses 18A through 18C in that order as counted clockwise.

The end portions 19, 19 of the first shaft support portion 18A are respectively fixed to the retaining recesses 15A and 15B; the end portions 19, 19 of the second shaft support portion 18B are respectively fixed to the retaining recesses 15C and 15D; and the end portions 19, 19 of the third shaft support portion 18C are respectively fixed to the retaining recesses 15E and 15F.

The end portions 19 are fixed to the retaining recesses 15 by being formed so as to fill the retaining recesses 15.

The intermediate portion 16 can be formed, for example, in an arcuate configuration in planar view; it is spaced away from the inner surface (inner edge 14a) of the central hole portion 14 and extends into the space in the central hole portion 14 (inner side space 26).

Regarding the intermediate portion 16, it is desirable for the central portion 16a in the longitudinal direction to be situated nearest to the center axis A1.

It is desirable that the intermediate portion 16 be formed such that the nearer to the end portions 19, the smaller the distance from the inner surface of the central hole portion 14 (inner edge 14a), and that the nearer to the central portion 16a, the larger the distance from the inner surface of the central hole portion 14 (inner edge 14a).

The thickness t of the intermediate portion 16 is smaller than the outer diameter of the end portions 19. It is desirable for the thickness t of the intermediate portion 16 to be fixed in the longitudinal direction of the intermediate portion 16.

The shaft support portion 18 is of a configuration (arcuate configuration) both ends 19, 19 of which are fixed to the component main body 11, so that it is superior in durability.

As shown in FIG. 2, the first surface 18d of the shaft support portion 18 can be formed flush with the first surface 11a of the component main body 11, and the second surface 18e of the shaft support portion 18 can be formed flush with the second surface 11b of the component main body 11.

The shaft support portion 18 is integral with the component main body 11.

The outer diameter of the component main body 11 may be, for example, several mm to several tens mm. The thickness of the component main body 11 is, for example, approximately 100 to 1000 μm.

The radius $r_{m1}$ shown in FIGS. 1 and 2 is the distance from the center axis A1 to the central portion 16a of the intermediate portion 16; it is the minimum distance from the center axis A1 to the shaft support portion 18.

The radius $r_{b1}$ is the distance from the center axis A1 to the central portion 17a of the displacement regulating protrusion 17; it is the minimum distance from the center axis A1 to the displacement regulating protrusion 17.

The radius $r_{b1}$ is set larger than the radius $r_{m1}$. That is, $r_{b1} > r_{m1}$. As a result, it is possible to permit displacement of the shaft member 30 within a range determined by the displacement regulating protrusion 17.

The distance d is the maximum separation distance from the inner edge 14a of the central hole portion 14 to the intermediate portion 16; in the example of FIG. 1, the radial distance from the central portion 16a of the intermediate portion 16 to the inner edge 14a.

The distance d is a dimension constituting the elastic deformation margin of the shaft support portion 18 when the shaft member 30 is forced into the inner space 26 (described below).

It is desirable for the distance d to be larger than the difference between the radius $r_{m1}$ and the radius $r_{b1}$. That is, it is desirable for the formula to hold good; $d > (r_{m1} - r_{b1})$.

This makes it possible to secure a sufficient elastic deformation margin, so that it is possible to increase the displacement permission amount of the shaft member 30.

The forcing-in portion 12 shown in FIG. 1 is formed by the three shaft support portions 18 arranged in the peripheral direction; however, the number of shaft support portions 18 is not restricted thereto. The number of shaft support portions 18 may be one or plural; however, to retain the shaft member 30 in a stable manner, it is desirable for the number to be three or more.

The elongation percentage of the material of the shaft support portion 18 is larger than the elongation percentage of the material of the component main body 11.

It is desirable for the shaft support portion 18 to be formed of a material capable of plastic deformation, such as a metal material. It is desirable for the metal material to be one capable of plastic flow and capable of being formed through electroforming.

Examples of such metal material include Au, Ni, Cu, and an alloy thereof. Examples of the alloy include Ni alloy, Cu alloy, and Au alloy. It is necessary to impart elasticity (e.g., bending elasticity) to the shaft support portion 18, so that it is necessary for the metal material used for it to be an electroforming material little subject to stress relaxation, such as Ni—Fe, Ni—Mn, Ni—P, and Ni—Pd.

As compared with a brittle material, a metal material is of higher bending strength, tensile strength, ductility, and critical distortion, and of lower fragility.

The material of the shaft support portion 18 may be a non-metal material (e.g., resin) so long as it satisfies the above conditions.

The shaft member 30 can be forced into the space 26 on the inner side of the shaft support portion 18 (inner space 26).

When the shaft member 30 is forced in, the central portion 16a of the intermediate portion 16 of the shaft support portion 18 abuts the shaft member 30, and is pressed outwards by the shaft member 30. As a result, the intermediate portion 16 undergoes elastic deformation such that the central portion 16a and the vicinity thereof are outwardly displaced, and the shaft member 30 is retained by the elastic force thereof (bending elastic force).

Through the retention of the shaft member 30 by the shaft support portion 18, the mechanical component 10 is fixed to the shaft member 30.

The diameter of the shaft member 30 may, for example, be approximately several tens to 500 μm.

After being mounted to the shaft member 30, the shaft support portion 18 may be bonded to the shaft member 30. As the bonding method, it is possible to adopt laser welding, soldering, diffusion bonding, brazing, eutectic bonding, thermo compression bonding, bonding by adhesive, bonding by wax, etc.

In the mechanical component 10, the elongation percentage of the shaft support portion 18 is larger than the elongation percentage of the component main body 11, and the shaft support portion 18 retains the shaft member 30 by elastic force, so that displacement of the shaft member 30 is permissible to some degree, whereby a superior buffer effect is provided. Thus, even when a brittle material is employed for the component main body 11, it is possible to prevent breakage of the mechanical component 10 due to the stress when the shaft member 30 is forced in.

Further, in the mechanical component 10, the shaft support portion 18 is capable of plastic deformation. Thus, displacement of the shaft member 30 in excess of the elastic deformation range is permissible, so that it is possible to enhance the buffer effect. Thus, even when a brittle material is used for the component main body 11, it is possible to prevent breakage of the mechanical component 10 due to the stress when the shaft member 30 is forced in.

The shaft support portion 18 exhibits bending elasticity, and is capable of plastic deformation, so that it is little subject to breakage.

Further, as stated above, the shaft support portion 18 exhibits a large displacement permission amount, so that it is possible to secure a sufficient rotation looseness torque and extraction force, making it possible to reliably support the shaft member 30. Thus, it is possible to reliably transmit the torque of the shaft member 30 to the component main body 11, making it possible to improve the timekeeping accuracy of the timepiece employing the mechanical component 10.

(First Embodiment, Mechanical Component Manufacturing Method)

Next, a method of manufacturing the mechanical component 10 of the first embodiment will be described with reference to FIGS. 3 through 6.

In FIG. 3, portions (a), (c), and (e) are plan views, and portions (b), (d), and (f) are sectional views taken along lines II-II', III-III', and IV-IV', respectively, of portions (a), (c), and (e). In FIG. 4, portions (a), (c), and (e) are plan views, and portions (b), (d), and (f) are sectional views taken along lines V-V', VI-VI', and VII-VII', respectively, of portions (a), (c), and (e). In FIG. 5, portions (a) and (c) are plan views, and portions (b) and (d) are sectional views taken along lines VIII-VIII' and IX-IX', respectively. In FIG. 6, portions (a) and (c) are plan views, and portions (b) and (d) are sectional views taken along lines X-X' and XI-XI', respectively.

The manufacturing method of the present embodiment includes the steps of: preparing a mold 41; forming a forcing-in portion 12 in the mold 41 through electroforming; and removing unnecessary portions.

(1) Preparation of the Mold

As shown in FIGS. 3 (a) and 3 (b), there is prepared a base member 31 formed of Si or the like.

Next, as shown in FIGS. 3 (c) and 3 (d), there is formed on at least one surface of the base member 31 (the first surface 31a in this example) a first mask 32 consisting of an oxide, such as $SiO_2$.

The first mask 32 has a plurality of openings 32a. The configuration in planar view of the opening 32a (the inner configuration of the first mask 32) is of a configuration corresponding to the configuration of the forcing-in portion 12 shown in FIG. 1(a). More specifically, it is of the same configuration in planar view as the forcing-in portion 12.

The portion surrounded by the openings 32a is referred to as the central portion 32b.

The outer configuration in planar view of the first mask 32 is the same as the outer configuration in planar view of the component main body 11.

The first mask 32 can be formed by performing patterning through photolithography on a coating film consisting of an oxide (e.g., $SiO_2$) formed, for example, on the entire area of the first surface 31a of the base member 31.

The patterning of the coating film can be conducted, for example, by the following method.

The above coating film is formed over the entire area of the first surface 31a of the base member 31, and a resist layer (not shown) is formed on the surface of this coating film. The resist layer may be a negative type photo resist or a positive type photo resist.

A predetermined photo mask is arranged on the surface of the resist layer to expose the resist layer. The configuration and dimension in planar view of the shield pattern of the photo mask correspond to the configuration and dimension in planar view of the component main body 11 shown in FIG. 1 (a).

Through the development of the resist layer, the unnecessary portion is removed, and the resist layer is of a configuration in conformity with the first mask 32.

Through the removal of the portion of the coating film where there is no resist layer by dry etching or the like, the first mask 32 shown in FIGS. 3(c) and 3(d) is formed. After the formation of the first mask 32, the resist layer is removed.

Next, as shown in FIG. 3(e) and FIG. 3(f), an annular second mask 33 is formed in the region on the outer side of the outer edge of the first mask 32.

By the second mask 33, the region of the first surface 31a of the base member 31 on the outer side of the first mask 32 is covered. The openings 32a are not covered with the second mask 33, so that, at the openings 32a, the first surface 31a of the base member 31 is exposed.

As shown in FIG. 3(e) and FIG. 3(f), a part of the second mask 33 may overlap the region including the outer edge of the first mask 32.

The second mask 33 can be formed, for example, by a resist layer. The resist layer may be a negative type photo resist or a positive type photo resist.

The resist layer can be formed, for example, through patterning by photolithography. For example, the resist layer is exposed through a predetermined photo mask and is developed, whereby it is possible to form the annular second mask 33 shown in FIG. 3 (e) and FIG. 3 (f).

Figure 4A:
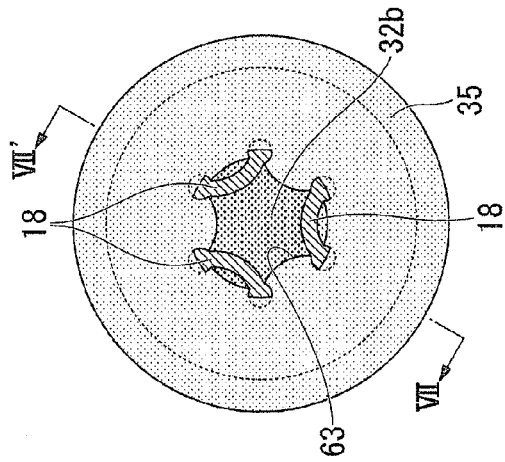
FIGS. 4(a) through 4(f) are explanatory views, subsequent to FIGS. 3(a) through 3(f), illustrating the method of manufacturing the mechanical component according to the embodiment of the present invention.
Figure 4C:
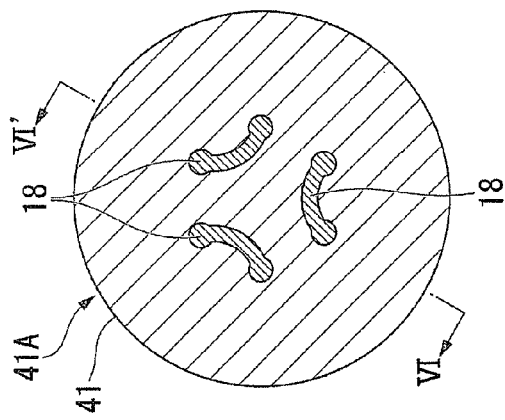
Figure 4E:
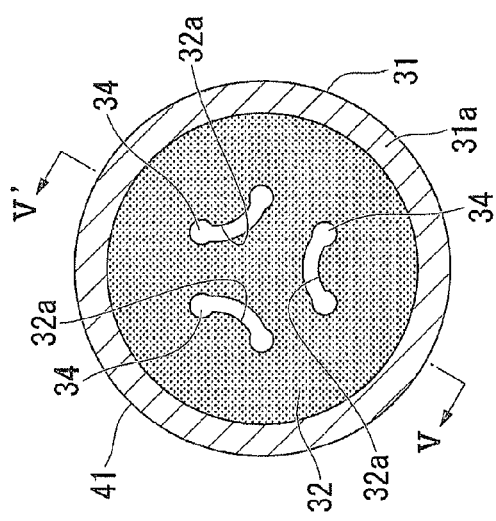
Figure 4B:
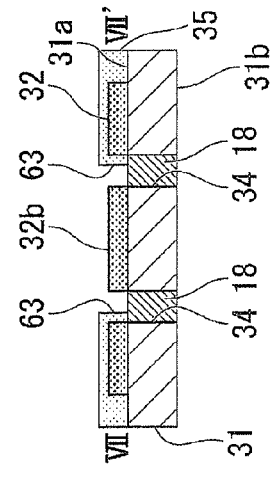

Next, as shown in FIGS. 4(a) and 4(b), the portion of the base member 31 exposed at the openings 32a of the first mask 32 is removed by dry etching or the like. As a result, there are formed in the base member 31 through-holes 34 of a plan view configuration and dimension in conformity with the openings 32a.

The through-holes 34 constitute the retaining recesses 15 in the subsequent process.

In this process, the region on the outer side of the first mask 32 is covered with the second mask 33, so that this region is not removed.

By removing the second mask 33, there is obtained a mold 41 in which the first mask 32 is formed on the surface of the base member 31 having the through-holes 34.

The etching employed in the manufacturing method of the present embodiment may be dry etching such as reactive ion etching (RIE), or wet etching using buffer hydro fluorine (BHF). As the RIE, it is desirable to adopt deep reactive ion etching (DRIE).

(2) Formation of the Forcing-in Portion

Figure 4D:
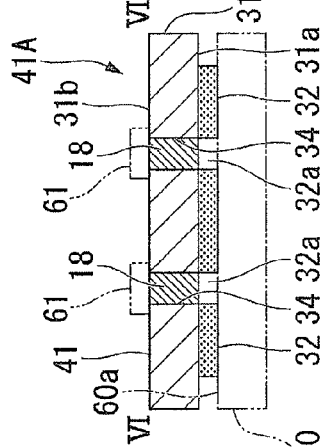

As shown in FIGS. 4(c) and 4(d), the mold 41 is fixed to the surface 60a of a substrate 60 by adhesion or the like. In this process, the mold 41 is in an attitude in which the first surface 31a of the base member 31 faces the substrate 60. The substrate 60 and the mold 41 fixed thereto will be referred to as the mold 41A with a substrate. A conductive film (not shown) consisting of metal or the like may be formed on the surface 60a of the substrate 60, or the substrate 60 itself may be formed of a conductive material.

In FIGS. 4(c) and 4(d), the mold 41 is in an attitude in which the first surface 31a faces downwards.

The shaft support portions 18 are formed of a metal material within the openings 32a of the mold 41. It is desirable for the shaft support portions 18 to be formed by electroforming.

Figure 7:
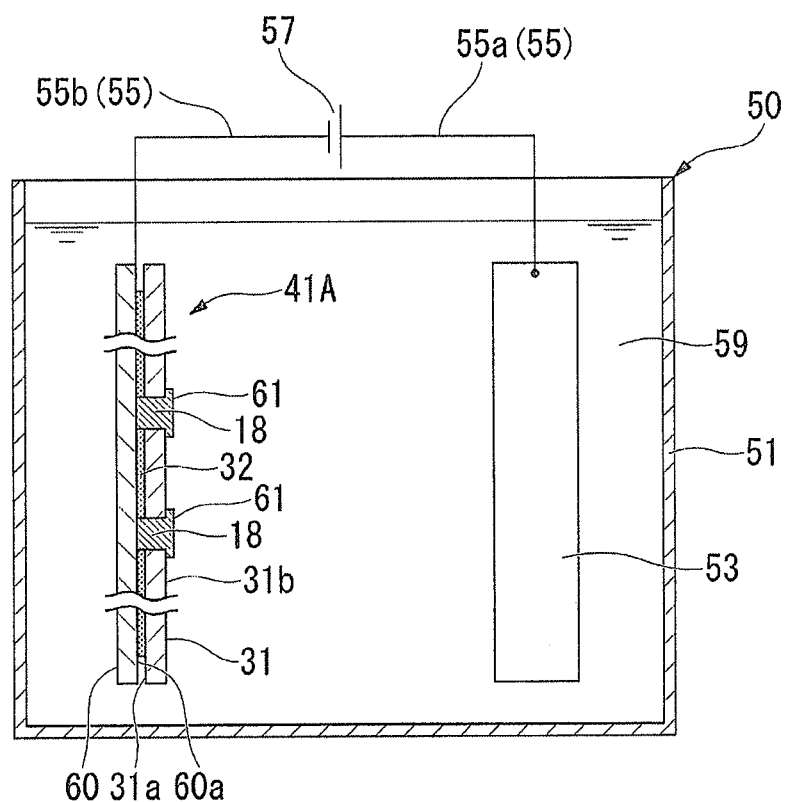
FIG. 7 is a diagram schematically illustrating an electroforming apparatus.

FIG. 7 is a schematic view of the construction of an electroforming apparatus 50 for forming the shaft support portions 18.

The electroforming apparatus 50 has an electroforming vessel 51, an electrode 53, electrical wiring 55, and a power source portion 57.

An electroforming liquid 59 is stored in the electroforming vessel 51. The electrode 53 is immersed in the electroforming liquid 59. The electrode 53 is of the same metal material as the shaft support portions 18.

The electrical wiring 55 has first wiring 55a and second wiring 55b. The first wiring 55a connects the electrode 53 and the anode side of the power source portion 57. The second wiring 55b connects the mold 41A with the substrate and the cathode side of the power source portion 57.

Due to this construction, the electrode 53 is connected to the anode side of the power source portion 57, and the mold 41A with the substrate is connected to the cathode side.

The electroforming liquid 59 is selected in accordance with the electroforming material. For example, when forming an electroforming member consisting of nickel, sulfamic acid bath, watt bath, sulfuric acid bath or the like is adopted. When performing nickel electroforming using sulfamic acid bath, there is put, for example, in the electroforming vessel 51, a sulfamic acid the main component of which is hydrated nickel sulfamate as the electroforming liquid 59.

As shown in FIG. 7, the mold 41A with the substrate is set in the electroforming apparatus 50, and the power source portion 57 is operated to apply voltage between the electrode 53 and the mold 41A with the substrate.

As a result, the metal (e.g., nickel) forming the electrode 53 is ionized and is migrated through the electroforming liquid 59 to be deposited in the region of the surfaces 60a of the substrate 60 facing the through-holes 34 of the mold 41.

As shown in FIGS. 4(c) and 4(d), the metal grows in the through-holes 34 to thereby form the shaft support portions 18. When the through-holes 34 have been filled with the metal, and the metal has grown to such a degree as to somewhat protrude from the second surface 31b, the application of the voltage is stopped.

Next, as indicated by phantom lines in FIG. 4(d), the metal of the portions (swollen portions 61) protruding from the second surface 31b is removed by grinding, polishing or the like. It is desirable for the metal surface to be flush with the second surface 31b.

More specifically, the mold 41 with the metal in the through-holes 34 is extracted from the electroforming vessel 51, and then it is possible to perform grinding/polishing on the second surface 31b of the mold 41, to flatten the second surface 31b, and to adjust the thickness of the mold 41.

As a result, the shaft support portions 18 are formed within the through-holes 41.

Then, the mold 41 is removed from the substrate 60.

(3) Removal of the Unnecessary Portions

Figure 4F:
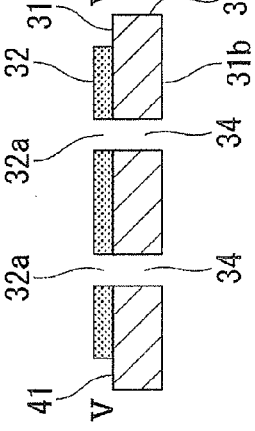

Next, as shown in FIGS. 4(e) and 4(f), a third mask 35 having a central portion 63 is formed on the first surface 31a of the base member 31. The configuration and dimension in planar view of the central hole portion 63 correspond to the configuration and dimension in planar view of the central hole portion 14 shown in FIG. 1(a).

As the material forming the third mask 35, it is desirable to select one not damaging the shaft support portions 18 formed of metal when removing the central portion 32b of the first mask 32 in the next step. The third mask 35 may be formed as a resist layer or a metal layer.

In FIGS. 4(e) and 4(f), the mold 41 is in an attitude in which the first surface 31a faces upwards.

Next, as shown in FIGS. 5(a) and 5(b), the central portion 32b of the first mask 32 is removed. To remove the central portion 32b, it is possible, for example, to adopt a dry etching using a fluorocarbon type gas.

Subsequently, as shown in FIGS. 5(c) and 5(d), the third mask 35 is removed by using organic solvent, $O_2$ plasma ashing, etc.

Figure 6A:
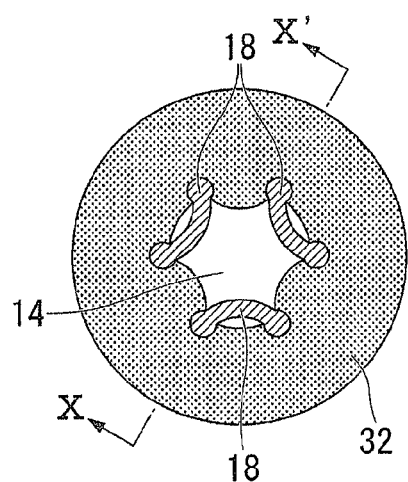
FIGS. 6(a) through 6(d) are explanatory views, subsequent to FIGS. 5(a) through 5(d), illustrating the method of manufacturing the mechanical component according to the embodiment of the present invention.
Figure 6C:
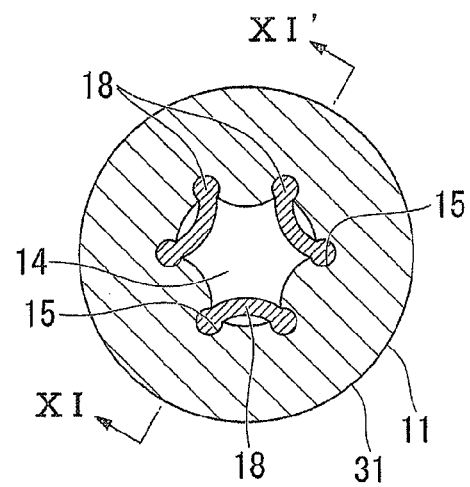
Figure 6B:
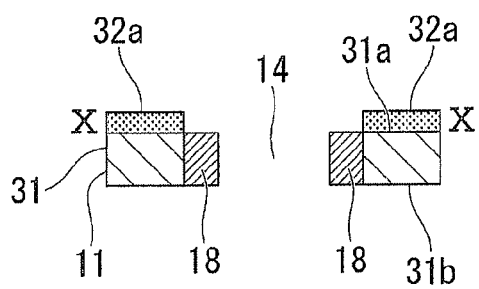

Next, as shown in FIGS. 6(a) and 6(b), the portion of the base member 31 where no first mask 32 is formed, that is, the regions situated on the inner side and the outer side of the first mask 32 in planar view is removed.

The portion of the base member 31 in the region situated on the inner side of the first mask 32 is removed, whereby the central hole portion 14 shown in FIG. 1(a) is formed in the base member 31.

The portion of the base member 31 in the region situated on the outer side of the first mask 32 is removed, whereby the component main body 11 of the configuration shown in FIG. 1(a) is obtained.

Figure 6D:
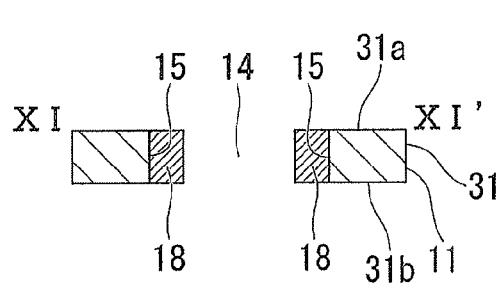

Next, as shown in FIGS. 6(c) and 6(d), the first mask 32 is removed. To remove the first mask 32, it is possible to adopt a dry etching using, for example, a fluorocarbon type gas.

As a result, there is obtained the mechanical component 10 shown in FIGS. 1 and 2.

In accordance with the mechanical component manufacturing method of the present embodiment, by using the common first mask 32, the forcing-in portion 12 is formed, and the outer configuration of the component main body 11 is determined, so that it is possible to enhance the coaxiality of component main body 11 with respect to the shaft member 30. Further, it is possible to enhance the dimensional precision in the radial direction.

Thus, axial deviation with respect to the shaft member 30 does not easily occur, making it possible to prevent offset during the operation of the mechanical component 10. Accordingly, it is possible to enhance the timekeeping accuracy of the timepiece using this mechanical component 10.

(Specific Example of the First Embodiment, Mechanical Component)

Figure 8:
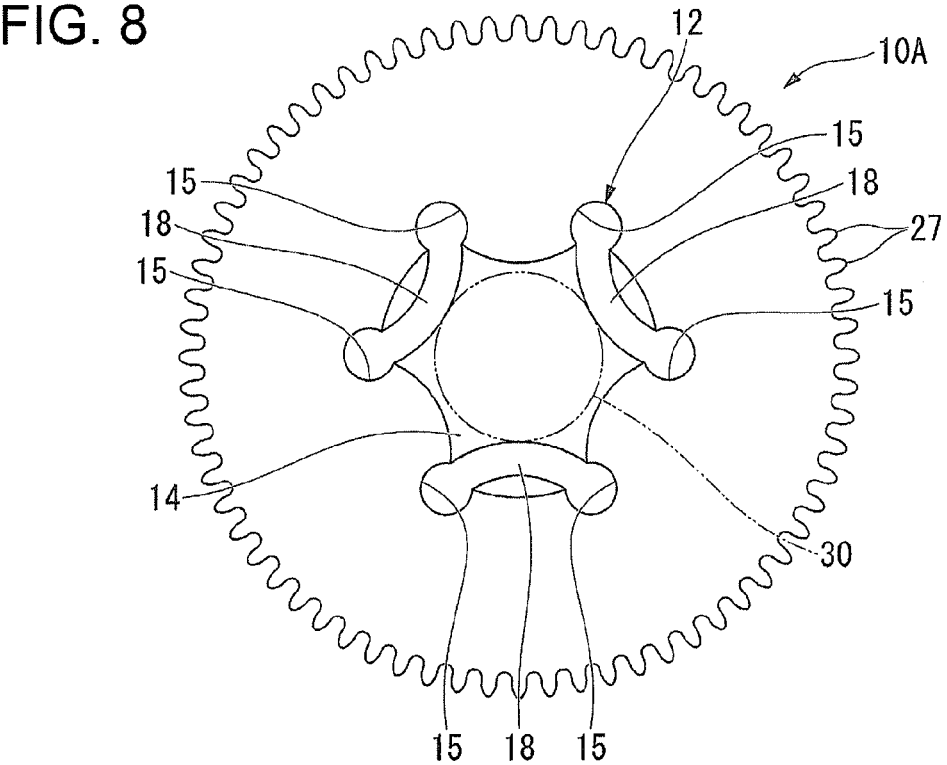
FIG. 8 is a plan view illustrating a specific example of a mechanical component according to a first embodiment of the present invention.

FIG. 8 is a plan view of a mechanical component 10A of a specific example of the mechanical component 10 according to the first embodiment.

The mechanical component 10A is a cogwheel; at the outer peripheral edge of the mechanical component 10A, there are formed a plurality of teeth 27 protruding radially outwards. The teeth 27 are gradually reduced in width in the protruding direction (i.e., of a tapered configuration). Due to the formation of the teeth 27, the mechanical component 10A can be brought into mesh with an adjacent cogwheel.

The cogwheel as the mechanical component 10A is used as a wheel & pinion or the like.

The mechanical component 10 is not restricted to a cogwheel like the mechanical component 10A; it may also be an escape wheel & pinion, a pallet fork, a balance wheel, etc.

(Second Embodiment, Mechanical Component)

A mechanical component 70 according to the second embodiment of the present invention will be described. In the following, the components that are the same as the above embodiment are indicated by the same reference numerals, and a description thereof will be left out.

Figure 9:
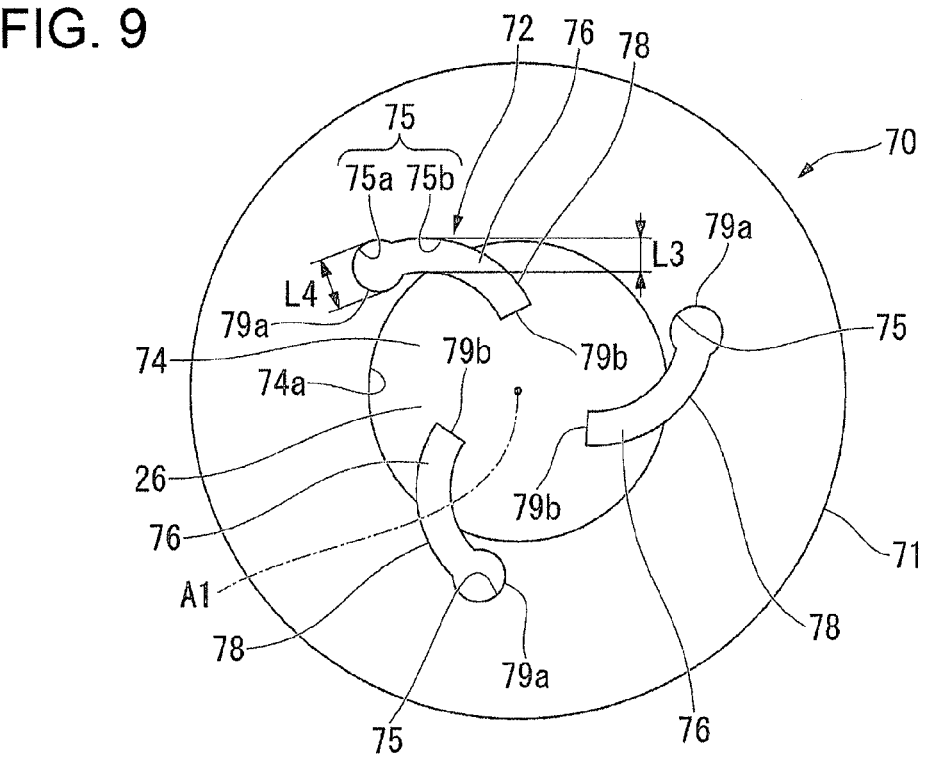
FIG. 9 is a plan view illustrating a mechanical component according to a second embodiment of the present invention.

FIG. 9 is a plan view of the mechanical component 70. As shown in FIG. 9, the mechanical component 70 is equipped with a substantially disc-like component main body 71, and a forcing-in portion 72 provided on the inner side of the component main body 71.

At the center of the component main body 71, there is formed a central hole portion 74 (through-hole) which is circular in planar view; at the inner edge 74a of the central hole portion 74, there are formed a plurality of (three in this example) retaining recesses 75 at peripheral intervals.

Each retaining recess 75 has a proximal end portion 75a of a substantially circular configuration in planar view to which a proximal end portion 79a of a shaft support portion 78 is fixed, and an extension portion 75b extending from the proximal end portion 75a to reach the inner edge 74a (inner surface) of the central hole portion 74.

The width dimension L3 of the extension portion 75b (first position) is smaller than the outer diameter of the proximal end portion 75a (second position) (width dimension L4). Thus, the retaining recess 75 functions as an anchor structure regulating displacement in which the shaft support portion 78 is detached.

Like the component main body 11 of the first embodiment, it is desirable for the component main body 71 to be formed of a brittle material such as a ceramic material.

The forcing-in portion 72 is formed by one or a plurality of shaft support portions 78. In FIG. 9, the forcing-in portion 72 is formed by three shaft support portions 78.

Each shaft support portion 78 has a proximal end portion 79a of a substantially circular configuration in planar view, and a distal end side portion 76 extending from the proximal end portion 79a. The proximal end portion 79a is fixed to the proximal end portion 75a. A part of the distal end side portion 76 extends from the inner surface (inner edge 74a) of the central hole portion 74 to the space in the central hole portion 74 (inner space 26).

The thickness of the distal end side portion 76 is smaller than the outer diameter of the proximal end portion 79a. It is desirable for the thickness of the distal end side portion 76 to be fixed in the longitudinal direction.

The distal end side portion 76 may be formed, for example, in an arcuate configuration in planar view; and it is desirable for the distal end portion 79b to be situated nearest to the center axis A1. The distal end side portion 76 may be of an arcuate configuration the arcuate path of which extending, for example, from the distal end portion 79b passes the center axis A1.

It is desirable for the portion of the distal end side portion 76 extending into the central hole portion 74 to be formed so as to be of the smaller distance to the inner surface (inner edge 74a) of the central hole portion 74 the nearer to the proximal end portion 79a; and so as to be of the larger distance to the inner surface (inner edge 74a) of the central hole portion 74 the nearer to the distal end portion 79b.

The elongation percentage of the shaft support portion 78 is larger than the elongation percentage of the component main body 71. It is desirable for the shaft support portion 78 to be formed of a material capable of plastic deformation, e.g., metal material. Like the shaft support portion 18 of the first embodiment, the shaft support portion 78 is formed, for example, by electroforming.

The shaft member 30 can be forced into the space 26 on the inner side of the shaft support portion 78 (inner space 26).

When the shaft member 30 is forced in, the distal end portion 79b of the distal end side portion 76 of each shaft support portion 78 abuts the shaft member 30, and is pressed outwards by the shaft member 30. As a result, the distal end side portion 76 undergoes elastic deformation such that the distal end portion 79b and the vicinity thereof are displaced outwards while retaining the shaft member 30 by its elastic force (bending elastic force).

Through the retention of the shaft member 30 by the shaft support portion 78, the mechanical component 70 is fixed to the shaft member 30.

Unlike the mechanical component 10 of the first embodiment, one end portion (distal end portion 79b) of the shaft support portion 78 of the mechanical component 70 is not fixed to the component main body 71; however, due to the sufficient bending elastic force of the shaft support portion 78, this mechanical component 70 is firmly fixed to the shaft member 30. Thus, it is possible to reliably transmit the torque of the shaft member 30 to the component main body 71, making it possible to improve the timekeeping accuracy of the timepiece.

Further, as in the case of the mechanical component 10 of the first embodiment, it is possible to enhance the buffer effect and to prevent breakage of the mechanical component 70.

(Third Embodiment, Mechanical Component)

A mechanical component 80 according to the third embodiment of the present invention will be described.

Figure 10:
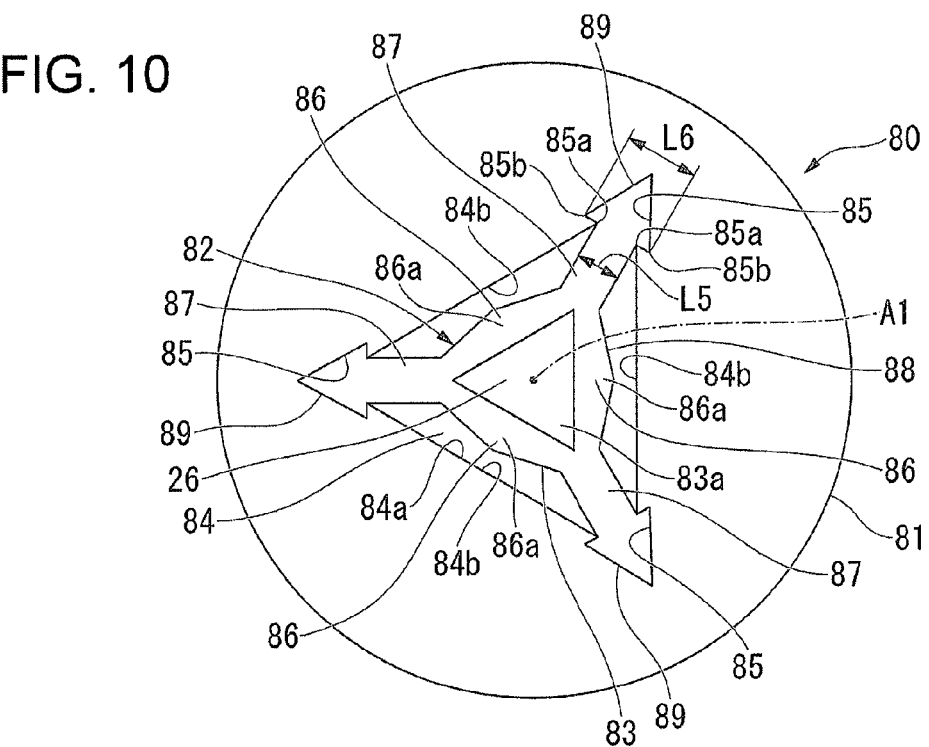
FIG. 10 is a plan view illustrating a mechanical component according to a third embodiment of the present invention.

FIG. 10 is a plan view of the mechanical component 80.

As shown in FIG. 10, the mechanical component 80 is equipped with a substantially disc-like component main body 81, and a forcing-in portion 82 provided on the inner side of the component main body 81.

At the center of the component main body 81, there is formed a central hole portion 84 (through-hole) of a substantially triangular configuration in planar view, and, of the inner edge 84a of the central hole portion 84, there are formed retaining recesses 85 at the positions including the apexes.

Each retaining recess 85 is of a triangular configuration in planar view, and the width dimension L5 at the innermost peripheral position 85a (the position nearest to the central hole portion 84; first position) is smaller than the width dimension L6 at the position 85b where the width dimension is maximum (second position).

This retaining recess 85 retains the end portion 89 of the shaft support portion 88, whereby it functions as an anchor structure regulating displacement of the shaft support portion 88 in the detachment direction. Due to this structure, it is possible to prevent detachment of the shaft support portion 88.

Like the component main body 11 of the first embodiment, it is desirable for the component main body 81 to be formed of a brittle material such as a ceramic material.

The forcing-in portion 82 is formed by the shaft support portion 88. The shaft support portion 88 has an annular shaft retaining portion 83 having a central hole portion 83a, and a plurality of extension portions 87 extending radially outwards from the shaft retaining portion 83.

The shaft retaining portion 83 is of a structure in which frame portions 86 are combined; it is formed inside the central hole portion 84, and is arranged so as to be spaced away from the inner edge 84a (inner surface) of the central hole portion 84. The shaft retaining portion 83 shown in FIG. 10 is a substantially triangular annular body formed through combination of three substantially linear frame portions 86; the central hole portion 83a is of a triangular configuration in planar view.

The inner edge of the frame portion 86 is formed in a linear configuration, and the outer edge thereof is formed in a protruding configuration. The protruding height of the outer edge of the frame portion 86 is maximum at the central portion 86a in the longitudinal direction. Thus, the outer edge of the central portion 86a is nearer to the inner edge 84a of the central hole portion 84 than the other portion of the frame portion 86.

The outer edge of the frame portion 86 is formed in a protruding configuration, so that the central portion 86a is formed thicker than the other portions. The central portion 86a of the frame portion 86 is in contact with the shaft member 30, so that it is subject to stress concentration; however, by forming the central portion 86a thick, it is possible to disperse the stress.

The end portion 89 of the extension portion 87 is formed so as to fill the retaining recess 85, and is formed in a substantially triangular configuration in planar view.

In the shaft support portion 88, the end portion 89 of the extension portion 87 is fixed to the retaining recess 85; the other portion thereof extends into the central hole portion 84 away from the inner edge 84a (inner surface) of the central hole portion 84.

The elongation percentage of the shaft support portion 88 is larger than the elongation percentage of the component main body 81. It is desirable for the shaft support portion 88 to be formed of a material capable of plastic deformation, e.g., a metal material. The shaft support portion 88 is formed by using, for example, electroforming.

The shaft member 30 can be forced into the space 26 on the inner side of the shaft support portion 83 (the inner space 26, the central hole portion 83a).

When the shaft member 30 is forced in, the central portion 86a of the frame portion 86 of the shaft retaining portion 83 abuts the shaft member 30, and is pressed outwards by the shaft member 30. As a result, the frame portion 86 undergoes elastic deformation such that the central portion 86a and the vicinity thereof are outwardly displaced, and retains the shaft member 30 due to its elastic force (bending elastic force).

Due to the retention of the shaft member 30 by the shaft support portion 88, the mechanical component 80 is fixed to the shaft member 30.

Of the inner edge 84a of the central portion 84 of the substantially triangular configuration in planar view, the central portion 84b of each side functions as a displacement regulating portion regulating the outward displacement of the shaft member 30 through abutment of the frame portion 86 (more specifically, the outer edge of the central portion 86a) when the shaft member 30 is detached from the predetermined normal position.

The frame portion 86 of the shaft support portion 88 has a sufficient bending elastic force, so that the mechanical component 80 is firmly fixed to the shaft member 30. Thus, it is possible to reliably transmit the torque of the shaft member 30 to the component main body 81, making it possible to improve the timekeeping accuracy of the timepiece.

Further, as in the case of the mechanical component 10 of the first embodiment, it is possible to enhance the buffer effect and to prevent breakage of the mechanical component 80.

The configuration in planar view of the central hole portion is not restricted to the triangular one; it may be of a polygonal configuration having four or more corners.

(Fourth Embodiment, Mechanical Component)

Figure 11:
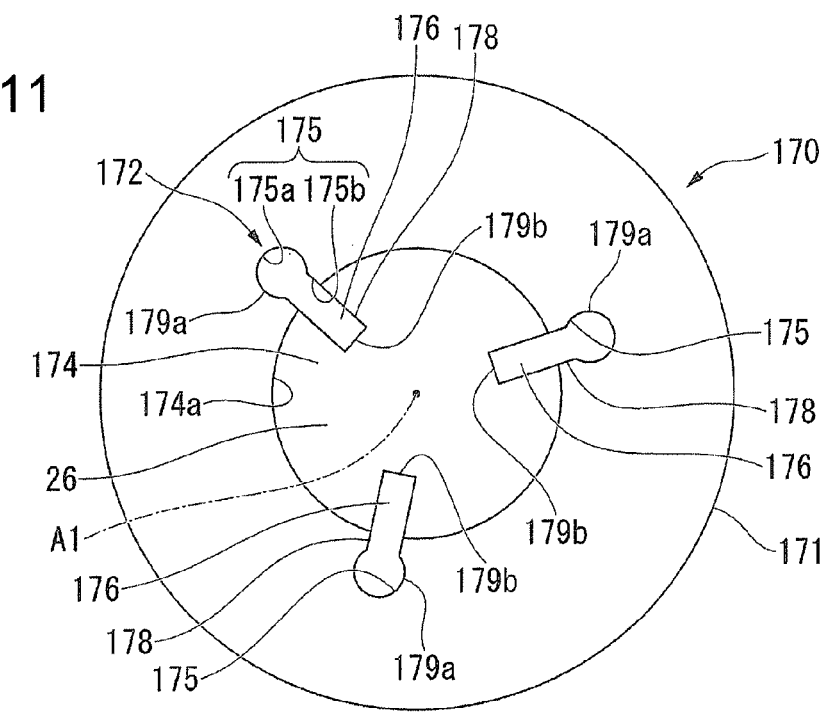
FIG. 11 is a plan view illustrating a mechanical component according to a fourth embodiment of the present invention.

FIG. 11 is a plan view of a mechanical component 170 according to the fourth embodiment of the present invention.

As shown in FIG. 11, the mechanical component 170 is equipped with a substantially disc-like component main body 171, and a forcing-in portion 172 provided on the inner side of the component main body 171.

Retaining recesses 175 are formed in the inner edge 174a of a central hole portion 174 (through-hole).

Each retaining recess 175 has a proximal end portion 175a of a substantially circular configuration to which the proximal end portion 179a of a shaft support portion 178 is fixed, and an extension portion 175b extending from the proximal end portion 175a to reach the inner edge 174a (inner surface) of the central hole portion 174. The width dimension of the extension portion 175b (first position) is smaller than the outer diameter of the proximal end portion 175a (second portion). The retaining recess 175 functions as an anchor structure regulating displacement of the shaft support portion 178. The component main body 171 is formed of a brittle material such as a ceramic material.

The forcing-in portion 172 is formed by one or a plurality of shaft support portions 178. In FIG. 11, the forcing-in portion 172 is formed by three shaft support portions 178.

Each shaft support portion 178 has a proximal end portion 179a of a substantially circular configuration in planar view, and a distal end side portion 176 extending from the proximal end portion 179a. The proximal end portion 179a is fixed to a proximal end portion 175a. A part of the distal end side portion 176 extends from the inner surface (inner edge 174a) of the central hole portion 174 into the space (inner space 26) in the central hole portion 174.

The distal end side portion 176 differs from the distal end side portion 76 shown in FIG. 9 in that it extends radially inwards. The thickness of the distal end side portion 176 is smaller than the outer diameter of the proximal end portion 179a. It is desirable for the thickness of the distal end side portion 176 to be fixed in the longitudinal direction.

The elongation percentage of the shaft support portion 178 is larger than the elongation percentage of the component main body 171. It is desirable for the shaft support portion 178 to be formed of a material capable of plastic deformation, for example, a metal material. The shaft support portion 178 is formed, for example, by electroforming.

When the shaft member 30 is forced into the inner space 26, the distal end portion 179b of the distal end side portion 176 of the shaft support portion 178 abuts the shaft member 30, and is pressed radially outwards by the shaft member 30. The distal end side portion 176 is pressed in the length direction, and undergoes slight elastic deformation so as to be shortened, retaining the shaft member 30 by its compression elastic force.

Through the retention of the shaft member 30 by the shaft support portion 178, the mechanical component 170 is fixed to the shaft member 30.

The mechanical component 170 can reliably transmit the torque of the shaft member 30 to the component main body 171, making it possible to improve the timekeeping accuracy of the timepiece. Further, it is possible to enhance the buffer effect, and to prevent breakage of the mechanical component 170.

(Fifth Embodiment, Mechanical Component)

Figure 12A:
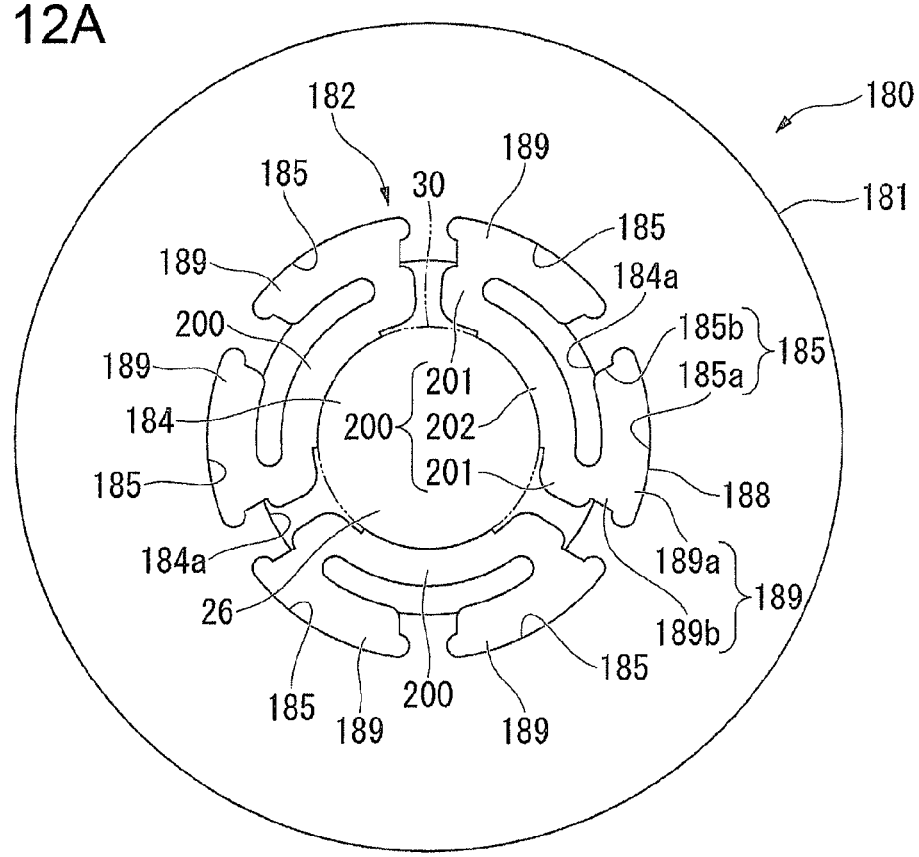
FIGS. 12(a) and 12(b) are diagrams illustrating a mechanical component according to a fifth embodiment of the present invention, wherein FIG. 12 (a) is an overall plan view, and FIG. 12 (b) is an enlarged plan view of a part of FIG. 12 (a).

FIG. 12 (a) is a plan view of a mechanical component 180 according to the fifth embodiment of the present invention. FIG. 12 (b) is an enlarged plan view of a part of the mechanical component 180.

The mechanical component 180 is equipped with a substantially disc-like component main body 181, and a forcing-in portion 182 provided on the inner side of the component main body 181.

At the inner edge 184a of the central hole portion 184 (through-hole), there are formed a plurality of (six, in this example) retaining recesses 185 at peripheral intervals.

Each retaining recess 185 has a proximal portion 185a to which a proximal portion 189a of a shaft support portion 188 is fixed, and a small-width portion 185b of a smaller peripheral dimension as compared with the proximal portion 185a. The small-width portion 185b is situated on the radially inner side of the proximal portion 185a. The component main body 181 is formed of a brittle material such as a ceramic material.

Each shaft support portion 188 is equipped with a pair of stationary portions 189, 189 provided in the adjacent retaining recesses 185, 185, and an intermediate portion 200 provided so as to connect them together.

The stationary portions 189 are formed within the retaining recesses 185. The portion formed on the proximal portion 185a will be referred to as the proximal portion 189a, and the portion formed on the small-width portion 185b will be referred to as the small-width portion 189b.

The small-width portion 185b of the retaining recess 185 is of a smaller peripheral dimension as compared with the proximal portion 189a of the stationary portion 189, so that the retaining recess 185 functions as an anchor structure regulating the displacement of the shaft support portion 188.

The intermediate portion 200 is equipped with proximal portions 201, 201 extending substantially inwards from the stationary portions 189, 189 into the central hole portion 184, and an inner peripheral extension portion 202 formed by connecting the distal ends (extension ends) of the proximal portions 201, 201. At the end portion of the inner peripheral extension portion 202, the intermediate portion 200 is bent. In the following, this portion will be referred to as the bent portion 204.

The inner peripheral extension portion 202 extends along the peripheral direction of the component main body 181. The inner peripheral extension portion 202 is spaced away radially inwards from the inner edge 184a of the central hole portion 184 and the stationary portions 189.

Figure 12B:
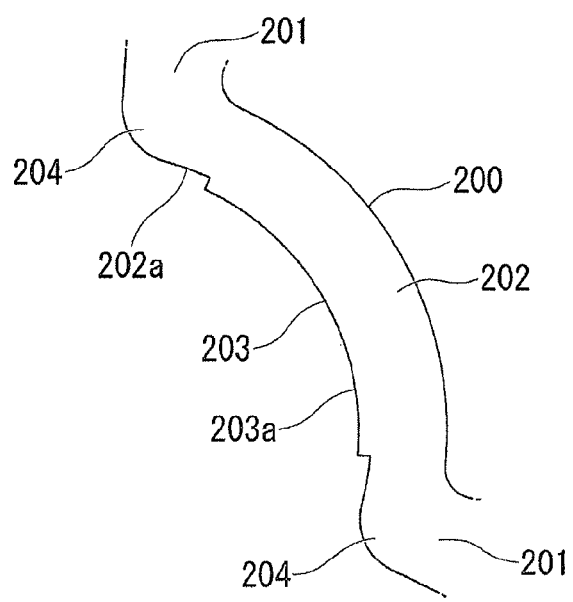

As shown in FIG. 12(b), at the inner edge 202a of the inner peripheral extension portion 202, there is formed a retaining protrusion 203 protruding inwards. The retaining protrusion 203 is formed to extend in the length direction of the inner peripheral extension portion 202.

It is desirable for the retaining protrusion 203 to be formed to extend over a part in the length direction of the inner peripheral extension portion 202, e.g., over a range including the central portion in the length direction of the inner peripheral extension portion 202. It is desirable for the retaining protrusion 203 to be formed on the central side in the length direction of the inner peripheral extension portion 202 beyond the bent portions 204.

It is desirable for the retaining protrusion 203 to protrude radially inwards beyond the bent portions 204. This helps to mitigate the stress concentration at the bent portions 204.

The inner edge 203a of the retaining protrusion 203 is formed to extend in the peripheral direction of the component main body 181, and can abut the outer peripheral surface of the shaft member 30.

The elongation percentage of the shaft support portion 188 is larger than the elongation percentage of the component main body 181. It is desirable for the shaft portion 188 to be formed of a material capable of plastic deformation such as a metal material. The shaft support portion 188 is formed, e.g., by electroforming.

When the shaft member 30 is forced into the inner space 26, the inner edge 203a of the retaining protrusion 203 of the inner peripheral extension portion 202 of each shaft support portion 188 abuts the shaft member 30, and is pressed radially outwards by the shaft member 30. By being pressed radially outwards, the inner peripheral extension portion 202 undergoes slight elastic deformation, and retains the shaft member 30 by a bending elastic force.

The inner peripheral extension portion 202 is of a configuration extending in the peripheral direction of the component main body 181, so that a wide peripheral range thereof abuts the shaft member 30. Thus, the force acting on the shaft support portion 188 is dispersed to thereby prevent breakage of the shaft support portion 188, and, at the same time, it is possible to reliably retain the shaft member 30 by the inner peripheral extension portion 202.

Further, the inner peripheral extension portion 202 is of a structure retaining the shaft member 30 by the retaining protrusion 203, so that the stress concentration at the end portions (bent portions 204) of the inner peripheral extension portion 202 is mitigated, making it possible to prevent breakage of the shaft support portion 188.

Through the retention of the shaft member 30 by the shaft support portion 188, the mechanical component 180 is fixed to the shaft member 30.

The shaft support portion 188 also allows elimination of the retaining protrusion 203. In that case, the shaft member 30 is retained by the inner edge 202a of the inner peripheral extension portion 202.

The mechanical component 180 is firmly fixed to the shaft member 30. Thus, it is possible to reliably transmit the torque of the shaft member 30 to the component main body 181, making it possible to improve the timekeeping accuracy of the timepiece. Further, it is possible to enhance the buffer effect and to prevent breakage of the mechanical component 180.

(Sixth Embodiment, Mechanical Component)

Figure 13:
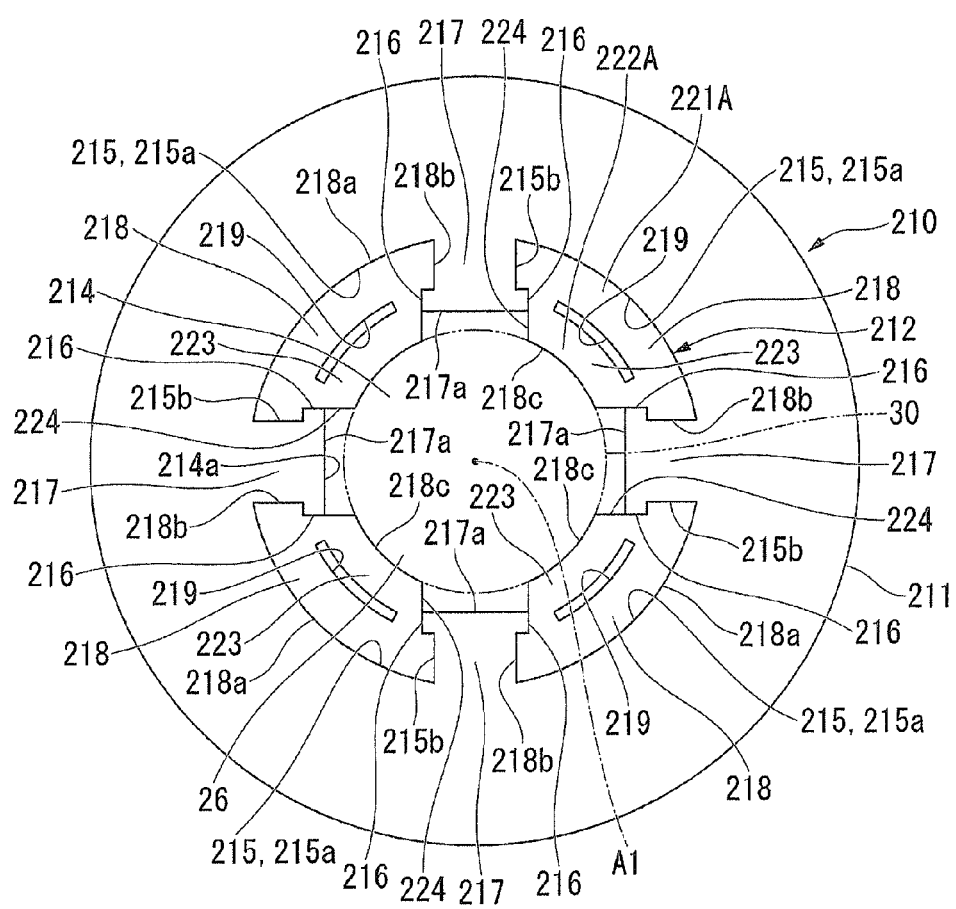
FIG. 13 is a plan view illustrating a mechanical component according to a sixth embodiment of the present invention.

FIG. 13 is a plan view of a mechanical component 210 according to the sixth embodiment of the present invention.

The mechanical component 210 is equipped with a component main body 211 and a forcing-in portion 212 provided on the inner side of the component main body 211.

At the inner edge 214a (inner surface) of a central hole portion 214 (through-hole), there are formed a plurality of retaining recesses 215. Each retaining recess 215 is formed in a substantially sector-shaped configuration in planar view having an arcuate peripheral edge 215a extending along the peripheral direction, and side edges 215b, 215b extending respectively inwards from both ends of the peripheral edge 215a. Each of the side edges 215b, 215b has a protrusion 216, 216 at a position spaced away from the peripheral edge 215a (a position on the inner side of the peripheral edge 215a).

The retaining recess 215 functions as an anchor structure regulating inner and peripheral displacement of the shaft support portion 218 through retention of the shaft support portion 218.

The component main body 211 is formed of a brittle material such as a ceramic material.

Each retaining recess 215 has the shaft support portion 218 forming the forcing-in portion 212.

Each shaft support portion 218 fills the inner space of the retaining recess 215, and is formed so as to protrude inwards beyond the inner edge 217a of an intermediate portion 217.

The shaft support portion 218 is formed substantially in a sector-shaped configuration which has, in planar view, an arcuate peripheral edge 218a abutting the peripheral edge 215a, a side edge 218b abutting the side edge 215b, and an inner edge 218c extending along the peripheral direction.

Of the shaft support portion 218, the portion formed in the retaining recess 215 will be referred to as the main portion 221A, and the portion protruding inwards beyond the inner edge 217a of the intermediate portion 217 will be referred to as the protrusion 222A.

The side edges 218b, 218b of the shaft support portion 218 has recesses 224, 224 formed at positions spaced away from the peripheral edge 218a (positions on the inner side of the peripheral edge 218a).

The elongation percentage of the shaft support portion 218 is larger than the elongation percentage of the component main body 211. It is desirable for the shaft support portion 218 to be formed of a material capable of plastic deformation such as a metal material. The shaft support portion 218 is formed by, for example, electroforming.

The shaft support portion 218 has an opening 219 which is a through-hole extending in the thickness direction. It is desirable for the opening 219 to be a slit extending in the peripheral direction of the component main body 211. It is desirable for the opening 219 to be of a configuration extending along the peripheral direction of the component main body 211. It is desirable for both end portions of the opening 219 to be at positions near both end portions in the peripheral direction of the shaft support portion 218 (e.g., positions close to the recess 224 or the side edge 218b).

The portion on the inner side of the opening 219 is an inner peripheral extension portion 223 extending along the peripheral direction of the component main body 211. The inner peripheral extension portion 223 can reliably retain the shaft member 30 by a bending elastic force.

The opening 219 can absorb distortion of the shaft support portion 218 generated through the retention of the shaft member 30, so that it can prevent breakage of the shaft support portion 218.

The opening 219 is a structure for imparting a bending elastic force to the inner peripheral extension portion 223, and its configuration is not restricted to that of the example shown. For example, so long as it is of a configuration extending over a sufficient peripheral range, it may not be of a configuration extending along the peripheral direction of the component main body 211.

When manufacturing the mechanical component 210, it is possible to form the opening 219 by using a core (not shown) in conformity with the configuration of the opening 219. For example, in the step of forming the shaft support portion 218 (See the step shown in FIGS. 4 (a) and 4(b)), the shaft support portion 218 is formed with the above-mentioned core installed inside the through-hole 34 of the base member 31, whereby it is possible to form the opening 219. After the formation of the shaft support portion 218, the core is removed from the shaft support portion 218.

The forcing-in portion 212 shown in FIG. 13 is formed by a plurality of shaft support portions 218 arranged in the peripheral direction. The shaft support portions 218 constitute a configuration in which an annular body is divided at a plurality of positions.

By forming the forcing-in portion 212 in a divided configuration, peripheral displacement of the forcing-in portion 212 does not easily occur, and the fixation strength of the forcing-in portion 212 with respect to the component main body 211 is further enhanced, making it possible to prevent rotation looseness during the operation of the mechanical component 210. Thus, it is possible to reliably transmit the torque of the shaft member 30 to the component main body 211.

The divisional number of the shaft support portions is one or more; preferably, it is two or more; and, more preferably, three or more.

The shaft member 30 can be forced into the space 26 (inner space 26) on the inner side of the inner edges 218c of the shaft support portions 218.

When the shaft member 30 is forced in, the shaft support portion 218 is pressed outwards to undergo plastic deformation in the compressing direction, and the inner edges 218c of the shaft support portions 218 retain the shaft member 30. Further, the inner peripheral extension portions 223 are pressed radially outwards, whereby they undergo slight elastic deformation, and retain the shaft member 30 reliably by a bending elastic force. As a result, the mechanical component 210 is fixed to the shaft member 30.

Thus, it is possible to reliably transmit the torque of the shaft member 30 to the component main body 211, making it possible to improve the timekeeping accuracy of the timepiece. Further, the buffer effect is enhanced, making it possible to prevent breakage of the mechanical component 210.

(First Modification of the First Embodiment, Mechanical Component)

Figure 14:
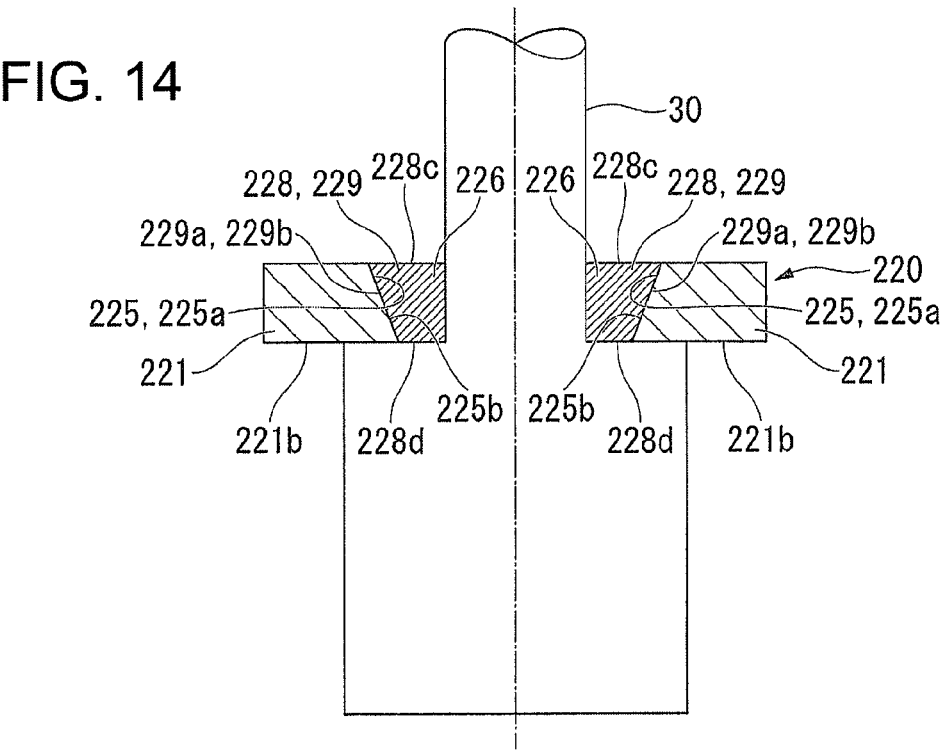
FIG. 14 is a schematic sectional view of a first modification of the mechanical component of FIG. 1.
Figure 15:
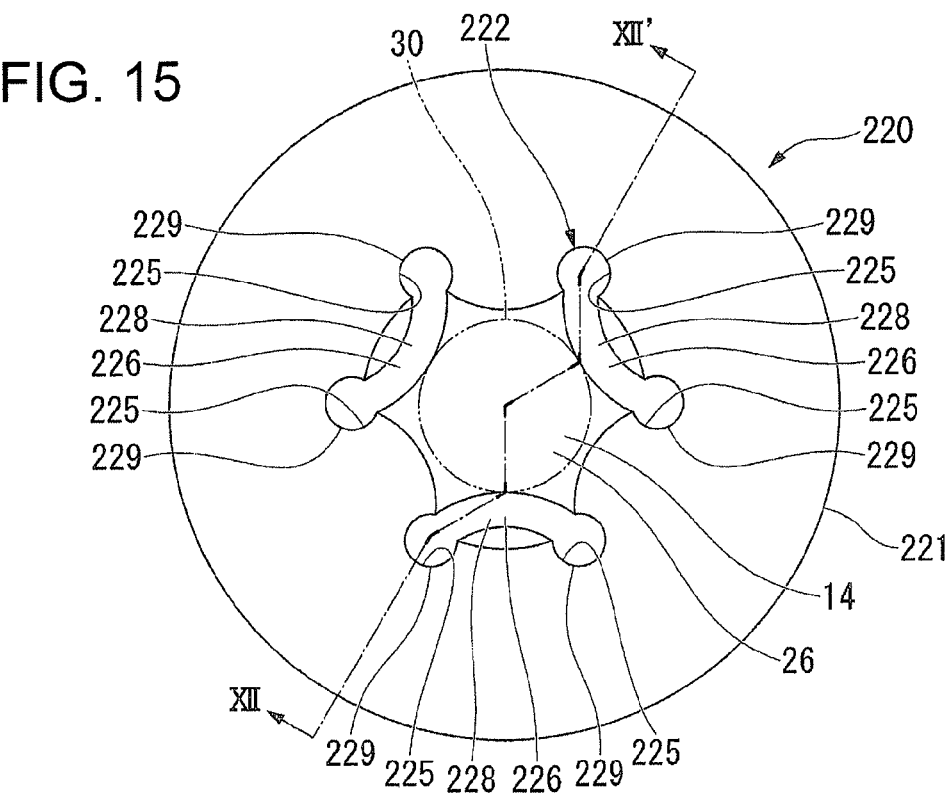
FIG. 15 is a plan view of the mechanical component of FIG. 14.

FIG. 14 is a schematic sectional view of a mechanical component 220 which is a first modification of the mechanical component 10 according to the first embodiment. FIG. 15 is a plan view of the mechanical component 220. FIG. 14 is a sectional view taken along the line XII-XII' (long and short dash line) of FIG. 15.

As shown in FIG. 15, the mechanical component 220 is equipped with a component main body 221 and a forcing-in portion 222. The forcing-in portion 222 is formed by a plurality of shaft support portions 228. The end portions 229 of each shaft support portion 228 are retained by retaining recesses 225. The portion between the end portions 229, 229 is referred to as the intermediate portion 226.

As shown in FIG. 14, the inner surface 225b of the peripheral edge 225a of the retaining recess 225 is an inclined surface inclined at a fixed angle so s to be reduced in diameter from a first surface 221a to a second surface 221b The shaft support portion 228 has a structure regulating displacement in the thickness direction (with respect to the component main body 221). More specifically, the outer surface 229b of the outer edge 229a of the end portion 229 of the shaft support portion 228 is an inclined surface inclined at a fixed angle so as to be reduced in diameter from a first surface 228c to a second surface 228d of the shaft support portion 228; it abuts the inner surface 225b over the entire surface.

The outer diameter (maximum outer diameter) of the first surface 228c of the shaft support portion 228 is larger than the inner diameter (minimum inner diameter) of the second surface 221b of the retaining recess 225, so that downward movement of the shaft support portion 228 (movement in the thickness direction of the component main body 221) is regulated.

Due to this structure, the mechanical component 220 can prevent detachment of the shaft support portions 228, and enhance the durability thereof.

(Second Modification of the First Embodiment, Mechanical Component)

Figure 16:
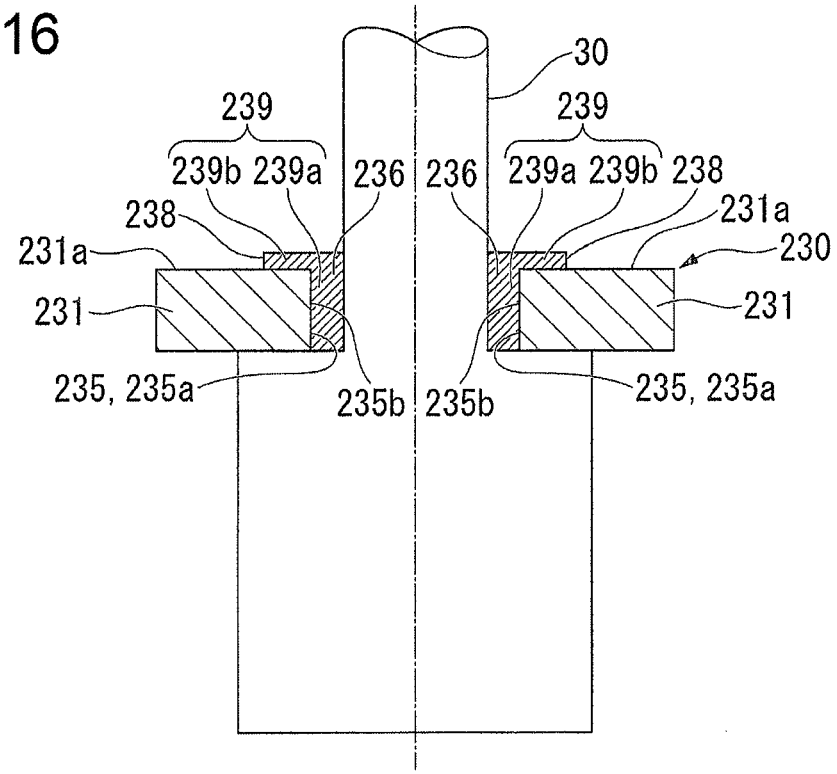
FIG. 16 is a schematic sectional view of a second modification of the mechanical component of FIG. 1.

FIG. 16 is a schematic sectional view of a mechanical component 230 which is a second modification of the mechanical component 10 according to the first embodiment. The mechanical component 230 has a shaft support portion 238 which has an intermediate portion 236 and end portions 239, 239.

The shaft support portion 238 is of a structure regulating the displacement in the thickness direction (with respect to the component main body 231). More specifically, an end portion 239 of the shaft support portion 238 is of an L-shaped sectional configuration consisting of a main body portion 239a and an outer extension portion 239b.

The main body portion 239a is provided on the inner surface 235b of the peripheral edge 235a of the retaining recess 235. The outer extension portion 239b extends radially outwards along the first surface 231a of the component main body 231 from the end portion on the first surface 231a side of the main body portion 239a.

Due to the first surface 231a that the outer extension portion 239b abuts, the shaft support portion 238 is regulated in downward movement (the movement in the thickness direction of the component main body 231).

Due to this structure, the mechanical component 230 can prevent detachment of the shaft support portions 238, and enhance the durability thereof.

(Third Modification of the First Embodiment, Mechanical Component)

Figure 17:
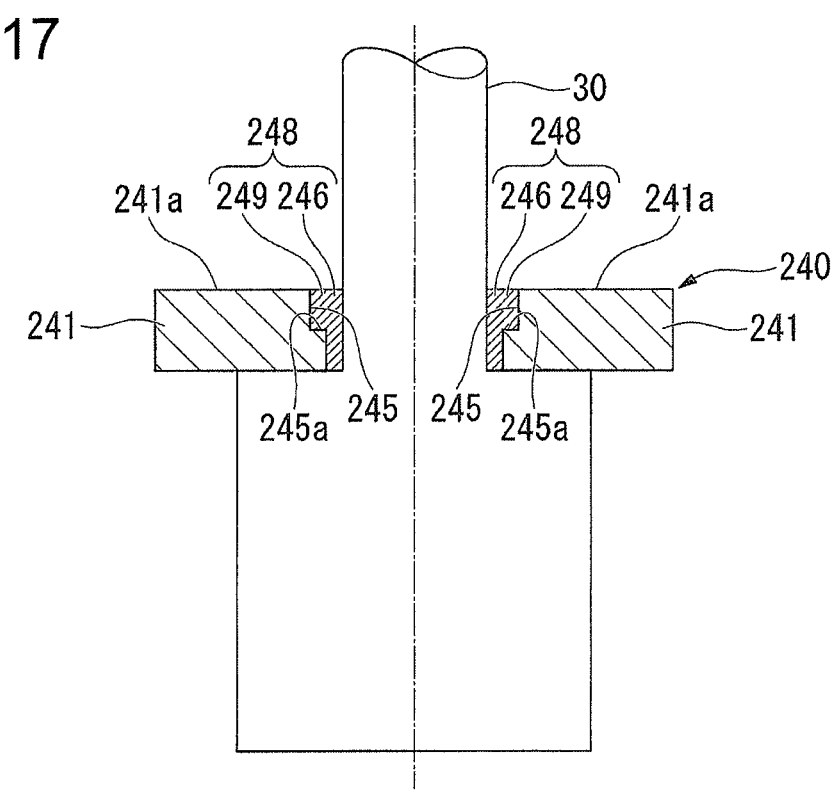
FIG. 17 is a schematic sectional view of a third modification of the mechanical component of FIG. 1.

FIG. 17 is a schematic sectional view of a mechanical component 240 which is a third modification of the mechanical component 10 according to the first embodiment. The mechanical component 240 has a shaft support portion 248 which has an intermediate portion 246 and end portions 249, 249.

The retaining recess 245 is formed not over the entire range in the thickness direction of the component main body 241 but is solely formed over a partial range. More specifically, the retaining recess 245 is formed over the thickness range from the intermediate position in the thickness direction to the first surface 241a.

The intermediate portion 246 of the shaft support portion 248 is of the same thickness as the component main body 241, and is formed over the entire thickness range of the component main portion 241.

The shaft support portion 248 is of a structure regulating displacement in the thickness direction (with respect to the component main body 241). More specifically, the end portion 249 of the shaft support portion 248 is formed thinner than the component main body 241, and is formed in a part of the thickness range of the component main body 241 (the thickness range from the intermediate position in the thickness direction to the first surface 241a), and is situated in the retaining recess 245. Thus, due to the bottom portion 245a of the retaining recess 245, the shaft support portion 248 is regulated in downward movement (movement in the thickness direction of the component main body 241).

Due to this structure, the mechanical component 240 can prevent detachment of the shaft support portions 248, and enhance the durability thereof.

(Fourth Modification of the First Embodiment, Mechanical Component)

Figure 18:
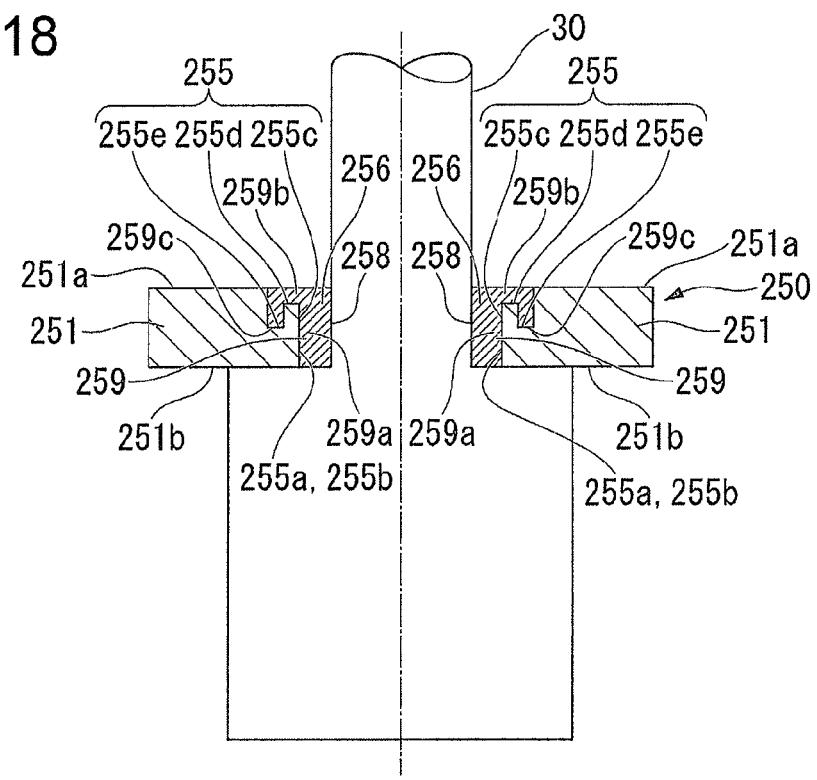
FIG. 18 is a schematic sectional view of a fourth modification of the mechanical component of FIG. 1.

FIG. 18 is a schematic sectional view of a mechanical component 250 which is a fourth modification of the mechanical component 10 according to the first embodiment. The mechanical component 250 has a shaft support portion 258 which has an intermediate portion 256 and end portions 259, 259.

The retaining recess 255 formed in the component main body 251 has a main portion 255c, a first surface recess 255d formed in the first surface 251a, and an outer edge recess 255e formed at the outer edge portion of the first surface recess 255d.

The main portion 255c is formed on the inner surface 255b of the peripheral edge 255a of the retaining recess 255. The outer edge recess 255e is formed as a recess facing the second surface 251b at the bottom surface of the outer edge portion of the first surface recess 255d.

The shaft support portion 258 is of a structure regulating displacement in the thickness direction (with respect to the component main body 251). More specifically, the end portion 259 of the shaft support portion 258 has a main body portion 259a, an outer extension portion 259b, and outer edge protrusion 259c.

The main body portion 259a is provided on the main portion 255c over the entire thickness direction of the component main body 251. The outer extension portion 259b protrudes radially outwards from the portion on the first surface 251a side of the main body portion 259a, and is formed in the first surface recess 255d. The outer edge protrusion 259c protrudes from the outer edge portion of the outer extension portion 259b toward the second surface 251b, and is formed in the outer edge recess 255e.

Due to the bottom portion of the first surface recess 255d and the bottom portion of the outer edge recess 255e, the shaft support portion 258 is regulated in downward movement (movement in the thickness direction of the component main body 251).

Due to this structure, the mechanical component 250 can prevent detachment of the shaft support portions 258, and enhance the durability thereof.

(Fifth Modification of the First Embodiment, Mechanical Component)

Figure 19:
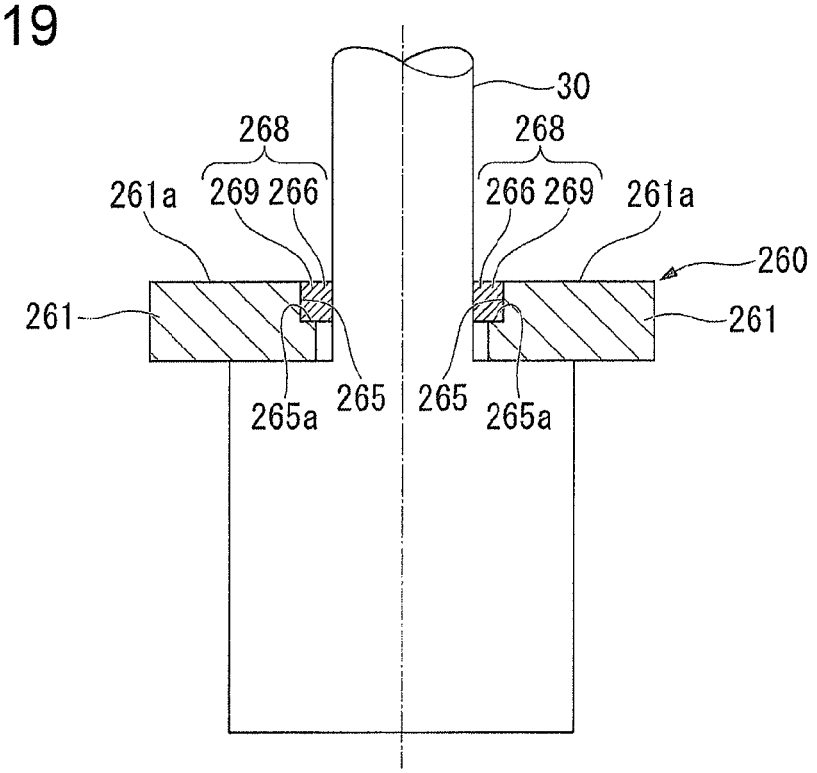
FIG. 19 is a schematic sectional view of a fifth modification of the mechanical component of FIG. 1.

FIG. 19 is a schematic sectional view of a mechanical component 260 which is a fifth modification of the mechanical component 10 according to the first embodiment. The mechanical component 260 has a shaft support portion 268 which has an intermediate portion 266 and end portions 269, 269.

The retaining recess 265 is formed over a part of the range in the thickness direction of the component main body 261, that is, over the thickness range from the intermediate position in the thickness direction to the first surface 261a.

The shaft support portion 268 is of a structure regulating displacement in the thickness direction (with respect to the component main body 261). More specifically, the end portion 269 of the shaft support portion 268 is thinner than the component main body 261, and is formed over a part of the thickness range of the component main body 241 (the thickness range from the intermediate position in the thickness direction to the first surface 261a), and is situated in the retaining recess 265. Thus, the shaft support portion 268 is regulated in downward movement (movement in the thickness direction of the component main body 261) due to the bottom portion 265a of the retaining recess 265.

The intermediate portion 266 of the shaft support portion 268 is of the same thickness as the end portion 269, and is formed over the same thickness range as the end portion 269.

Due to the above structure regulating displacement in the thickness direction, the mechanical component 260 can prevent detachment of the shaft support portions 268, and enhance the durability thereof.

(Sixth Modification of the First Embodiment, Mechanical Component)

Figure 20:
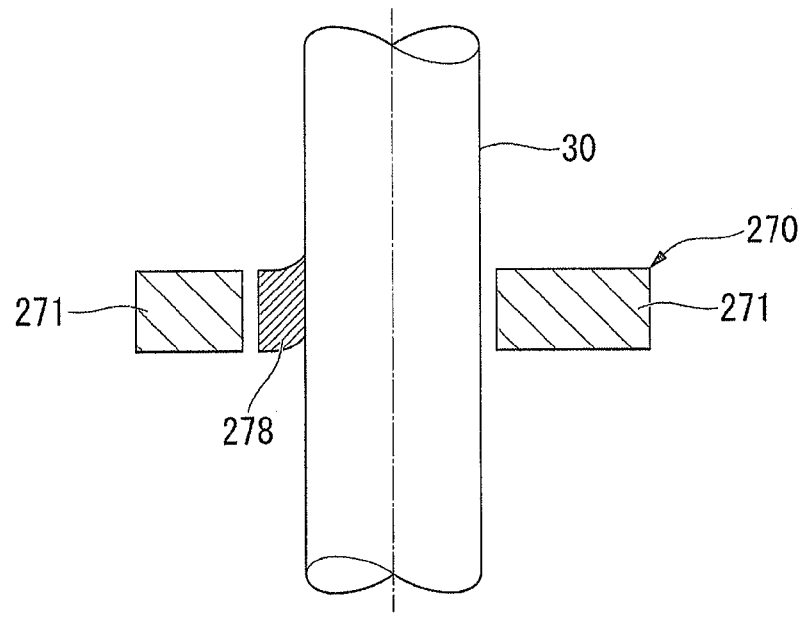
FIG. 20 is a schematic sectional view of a sixth modification of the mechanical component of FIG. 1.

FIG. 20 is a schematic sectional view of a mechanical component 270 which is a sixth modification of the mechanical component 10 according to the first embodiment.

The shaft support portion 278 formed in the retaining recess of the component main body 271 is capable of elastic deformation in the thickness direction of the component main body 271, and retains the shaft member 30 due to this elastic force.

(Timepiece)

In the following, a movement and a timepiece according to an embodiment of the present invention will be described with reference to the drawings. In the drawings referred to, the scale of each member is changed as appropriate so that each member may be large enough to be recognizable.

Generally speaking, the mechanical body including the drive portion of a timepiece is referred to as the "movement." A dial and hands are mounted to the movement, and the complete product obtained by putting the whole in a timepiece case is referred to as the "complete" of the timepiece. Of both sides of a main plate constituting the base plate of the timepiece, the side where the windshield of the timepiece case exists, that is, the side where the dial exists is referred to as the "back side" or "dial side" of the movement. Of the two sides of the main plate, the side where the case back of the timepiece exists, that is, the side opposite the dial is referred to as the "front side" or "case back side" of the movement.

Figure 21:
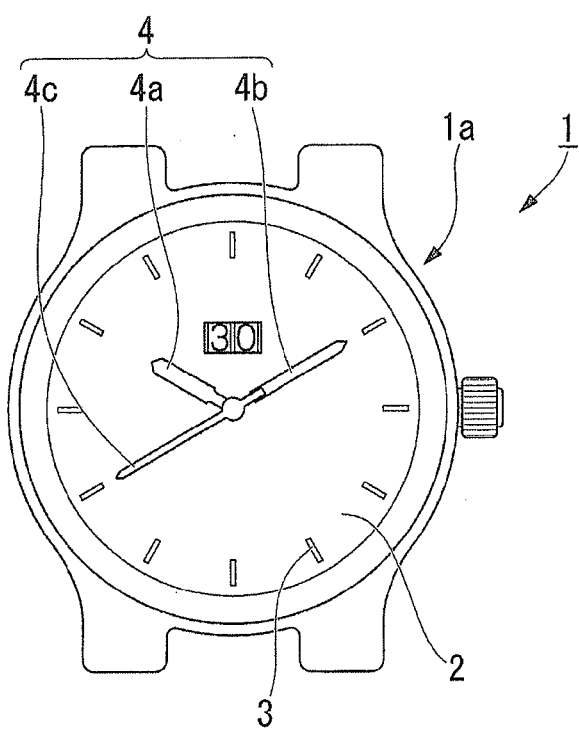
FIG. 21 is a plan view of a complete according to an embodiment of the present invention.

FIG. 21 is a plan view of a complete.

As shown in FIG. 21, a complete 1a of a timepiece 1 is equipped with a dial 2 having a scale 3, etc. indicating information regarding time, and hands 4 including an hour hand 4a indicating hour, a minute hand 4b indicating minute, and a second hand 4c indicating second.

Figure 22:
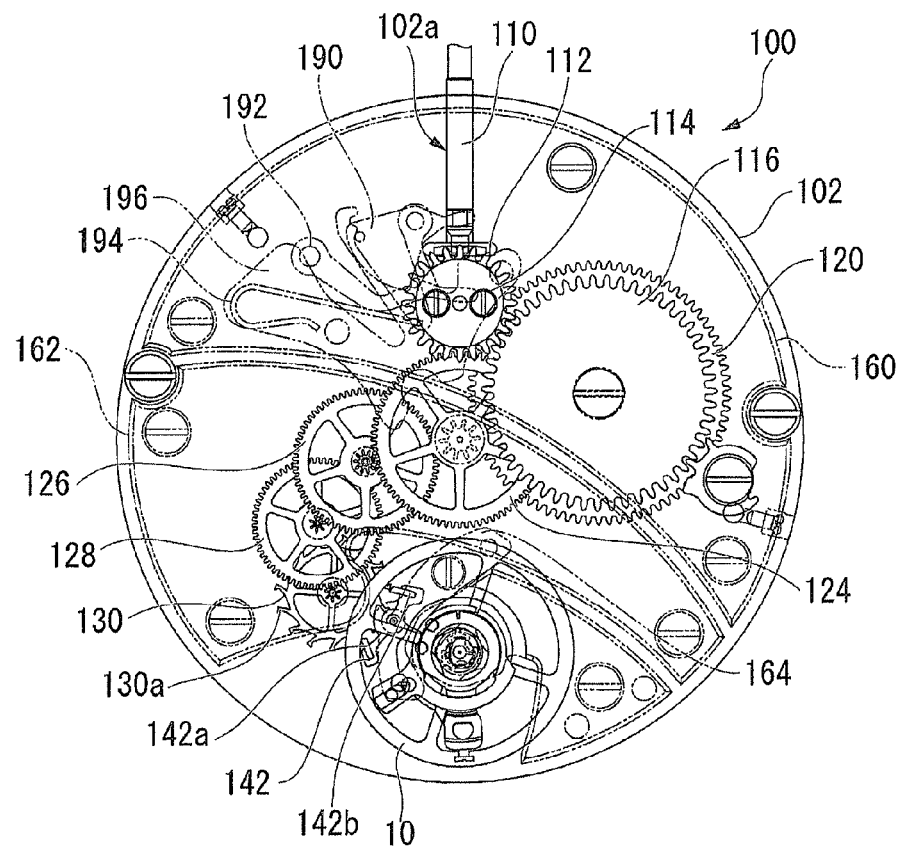
FIG. 22 is a plan view of the front side of a movement according to an embodiment of the present invention.
Figure 23:
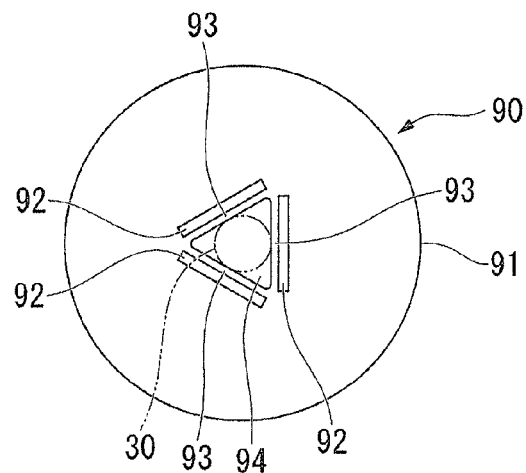
FIG. 23 is a plan view of an of a conventional mechanical component.

FIG. 22 is a plan view of the front side of a movement. In FIG. 22, in order that the drawing may be easy to see, part of the timepiece components constituting the movement 100 are omitted.

The movement 100 of the mechanical timepiece has a main plate 102 constituting the base plate. A winding stem 110 is rotatably incorporated into a winding stem guide hole 102a of the main plate 102. The position in the axial direction of this winding stem 110 is determined by a switching device including a setting lever 190, a yoke 192, a yoke spring 194, and a setting lever jumper 196.

And, when the winding stem 110 is rotated, a winding pinion 112 is rotated through the rotation of a clutch wheel (not shown). Through the rotation of the winding pinion 112, a crown wheel 114 and a ratchet wheel 116 are rotated successively, and a mainspring (not shown) accommodated in a movement barrel 120 is wound up.

The movement barrel 120 is rotatably supported between the main plate 102 and a barrel bridge 160. A center wheel & pinion 124, a third wheel & pinion 126, a second wheel & pinion 128, and an escape wheel & pinion 130 are rotatably supported between the main plate 102 and a train wheel bridge 162.

When the movement barrel 120 rotates due to the restoring force of the mainspring, the center wheel & pinion 124, the third wheel & pinion 126, the second wheel & pinion 128, and the escape wheel & pinion 130 rotate successively. The movement barrel 120, the center wheel & pinion 124, the third wheel & pinion 126, and the second wheel & pinion 128 constitute the front train wheel.

When the center wheel & pinion 124 rotates, a cannon pinion (not shown) rotates simultaneously based on the rotation thereof, and the minute hand 4b (See FIG. 21) mounted to the cannon pinion indicates "minute." Further, based on the rotation of the cannon pinion, an hour wheel (not shown) rotates via the rotation of a minute wheel (not shown), and the hour hand 4a (See FIG. 21) mounted to the hour wheel indicates "hour."

An escapement/governor device for controlling the rotation of the front train wheel is composed of the escape wheel & pinion 130, a pallet fork 142, and the mechanical component 10 (balance wheel).

Teeth 130a are formed in the outer periphery of the escape wheel & pinion 130. The pallet fork 142 is rotatably supported between the main plate 102 and a pallet bridge 164, and is equipped with a pair of pallets 142a and 142b. The escape wheel & pinion 130 is temporarily at rest with one pallet 142a of the pallet fork 142 being engaged with the teeth 130a of the escape wheel & pinion 130.

The mechanical component 10 (balance wheel) makes reciprocating rotation at a fixed cycle, whereby one pallet 142a and the other pallet 142b of the pallet fork 142 are alternately engaged and disengaged with and from the teeth 130a of the escape wheel & pinion 130. As a result, the escapement of the escape wheel & pinion 130 is effected at a fixed speed.

In the above construction, there is provided the mechanical component of the above-described embodiment, so that it is possible to provide a movement and a timepiece of high timekeeping accuracy.

The present invention is not restricted to the above-described embodiment but allows various modifications without departing from the scope of the gist of the present invention. That is, the concrete configuration, construction, etc. of the embodiment are only given by way of example, and allow modification as appropriate.

What is claimed is:

1. A mechanical component configured to rotate with a shaft member, comprising:
   a component main body having a through-hole through which the shaft member is passed; and
   one or more shaft support portions protruding inwardly from the inner surface of the through-hole and serving to fix the shaft member to the component main body; wherein
   the one or more shaft support portions protrude into the through-hole from the inner surface of the through-hole and are capable of retaining the shaft member due to an elastic force;
   the component main body has a retaining recess as an anchor structure fixing each shaft support portion by retaining a part of the shaft support portion;
   each retaining recess extends outwardly from the through-hole and has a width dimension at a first position nearest to the through-hole that is smaller than the width dimension at a second position farther outward from the through-hole;
   the component main body is made of a material different from that of the one or more shaft support portions; and the elongation percentage of the material of the one or more shaft support portion is larger than the elongation percentage of the material of the component main body.

2. The mechanical component according to claim 1, wherein the one or more shaft support portions are formed of a material capable of plastic deformation and of retaining the shaft member by a bending elastic force.

3. The mechanical component according to claim 2, wherein one end side and the other end side of each shaft support portion are connected together by an intermediate portion and are each fixed to the component main body, and the intermediate portion is formed in an arcuate configuration spaced away from the inner surface of the through-hole and is capable of retaining the shaft member by a bending elastic force.

4. The mechanical component according to claim 2, wherein the inner surface of the through-hole has a displacement regulating protrusion which, when the shaft member is deviated from a predetermined normal position, abuts the shaft member to regulate its outward displacement.

5. The mechanical component according to claim 2, wherein each shaft support portion has a pair of stationary portions one end side and the other end side of which are fixed in respective retaining recesses of the component main body, a proximal portion extending inwardly from each stationary portion into the through-hole, and an inner peripheral extension portion connecting ends of the proximal portions to each other, the inner peripheral extension portion extending in the peripheral direction of the component main body and capable of retaining the shaft member by a bending elastic force.

6. The mechanical component according to claim 1, wherein one end side and the other end side of each shaft support portion are connected together by an intermediate portion and are each fixed to the component main body, and the intermediate portion is formed in an arcuate configuration spaced away from the inner surface of the through-hole and is capable of retaining the shaft member by a bending elastic force.

7. The mechanical component according to claim 1, wherein the inner surface of the through-hole has a displacement regulating protrusion which, when the shaft member is deviated from a predetermined normal position, abuts the shaft member to regulate its outward displacement.

8. The mechanical component according to claim 1, wherein each shaft support portion has a pair of stationary portions one end side and the other end side of which are fixed in respective retaining recesses of the component main body, a proximal portion extending inwardly from each stationary portion into the through-hole, and an inner peripheral extension portion connecting ends of the proximal portions to each other, the inner peripheral extension portion extending in the peripheral direction of the component main body and capable of retaining the shaft member by a bending elastic force.

9. The mechanical component according to claim 8, wherein the inner peripheral extension portion has an inwardly protruding retaining protrusion abutting the shaft member to retain the same, the retaining protrusion protruding inwards from an end portion of the inner peripheral extension portion.

10. The mechanical component according to claim 1, wherein each shaft support portion has an opening formed to extend in the peripheral direction of the component main body.

11. The mechanical component according to claim 1, wherein each shaft support portion has a displacement regulating structure regulating displacement in the thickness direction with respect to the component main body.

12. The mechanical component according to claim 1, wherein the component main body is formed of a brittle material; and each shaft support portion is formed of metal material.

13. The mechanical component according to claim 1, wherein each shaft support portion forms a forcing-in portion into which the shaft member is forced to be thereby fixed to the shaft member.

14. A movement equipped with a mechanical component as claimed in claim 1.

15. A timepiece equipped with a movement as claimed in claim 14.

16. A method of manufacturing a mechanical component configured to rotate with a shaft member,
the mechanical component comprising:
a component main body having a through-hole through which the shaft member is passed; and
one or more shaft support portions protruding inwardly from the inner surface of the through-hole and serving to fix the shaft member to the component main body,
the component main body having a retaining recess as an anchor structure fixing each shaft support portion by retaining a part of the shaft support portion,
each retaining recess extending outwardly from the through-hole and having a width dimension at a first position nearest to the through-hole that is smaller than the width dimension at a second position farther outward from the through-hole,
the one or more shaft support portions protruding into the through-hole from the inner surface of the through-hole and being capable of retaining the shaft member due to an elastic force,
the component main body being made of a material different from that of the one or more shaft support portions, and
the elongation percentage of the material of the one or more shaft support portions being larger than the elongation percentage of the material of the component main body, the method comprising the steps of:
forming a mask having an inner configuration corresponding to the configuration of the one or more shaft support portions and an outer configuration corresponding to the outer configuration of the component main body on at least one surface of a base member constituting the component main body and forming a structure for retaining the one or more shaft support portions on the base member in conformity with the inner configuration of the mask;
forming the one or more shaft support portions through electroforming; and
removing unnecessary portions of the base member in conformity with the outer configuration of the mask.

* * * * *